(12) United States Patent
Bin et al.

(10) Patent No.: US 10,745,148 B2
(45) Date of Patent: Aug. 18, 2020

(54) STABILIZING PLATFORM AND CAMERA

(71) Applicant: SZ DJI TECHNOLOGY CO., LTD., Shenzhen (CN)

(72) Inventors: Peng Bin, Shenzhen (CN); Peng Wang, Shenzhen (CN); Chengyu Yin, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/044,924

(22) Filed: Jul. 25, 2018

(65) Prior Publication Data

US 2019/0002125 A1 Jan. 3, 2019

Related U.S. Application Data

(63) Continuation of application No. PCT/CN2016/072229, filed on Jan. 26, 2016.

(51) Int. Cl.
*G03B 17/56* (2006.01)
*F16M 13/02* (2006.01)
(Continued)

(52) U.S. Cl.
CPC .......... *B64D 47/08* (2013.01); *B64C 39/024* (2013.01); *F16M 11/10* (2013.01); *F16M 11/18* (2013.01);
(Continued)

(58) Field of Classification Search
CPC ... G03B 15/006; G03B 15/561; G03B 17/561
See application file for complete search history.

(56) References Cited

U.S. PATENT DOCUMENTS 5,900,925 A * 5/1999 Navarro ................ H04N 5/232
348/E5.022
10,501,204 B2 * 12/2019 Kang ..................... F16M 13/02
(Continued)

FOREIGN PATENT DOCUMENTS

CN 202392374 U 8/2012
CN 202647109 U 1/2013
(Continued)

OTHER PUBLICATIONS

The World Intellectual Property Organization (WIPO) International Search Report and Written Opinion for PCT/CN2016/072229 dated Oct. 31, 2016.

*Primary Examiner* — Minh Q Phan
(74) *Attorney, Agent, or Firm* — Anova Law Group, PLLC

(57) ABSTRACT

A stabilizing platform for stabilizing a payload includes a frame assembly, a plurality of actuators, and a plurality of electronic speed control (ESC) units. The frame assembly includes a plurality of frame components movable relative to one another and is configured to support the payload. The plurality of actuators are configured to permit the plurality of frame components to move relative to one another. The plurality of actuators include a first actuator that is configured to control movement of the payload about a first axis and a second actuator that is configured to control movement of the payload about a second axis. Each of the plurality of ESC units is electrically coupled to a corresponding actuator of the plurality of actuators and is configured to control actuation of the corresponding actuator. At least one of the plurality of ESC units is received in the payload.

36 Claims, 13 Drawing Sheets

(51) Int. Cl.
*B64D 47/08* (2006.01)
*B64C 39/02* (2006.01)
*F16M 11/20* (2006.01)
*F16M 11/18* (2006.01)
*F16M 11/10* (2006.01)
*G03B 15/00* (2006.01)
*G05D 1/00* (2006.01)

(52) U.S. Cl.
CPC ........ *F16M 11/2071* (2013.01); *F16M 13/02* (2013.01); *F16M 13/022* (2013.01); *G03B 15/006* (2013.01); *G03B 17/561* (2013.01); *B64C 2201/027* (2013.01); *B64C 2201/127* (2013.01); *B64C 2201/141* (2013.01); *B64C 2201/146* (2013.01); *F16M 2200/041* (2013.01); *F16M 2200/042* (2013.01); *F16M 2200/044* (2013.01); *G05D 1/0094* (2013.01)

(56) References Cited

U.S. PATENT DOCUMENTS

| | | | |
|---|---|---|---|
| 2010/0058251 A1* | 3/2010 | Rottler | G06F 3/04845 715/863 |
| 2013/0222685 A1* | 8/2013 | Topliss | G02B 27/646 348/373 |
| 2014/0037278 A1* | 2/2014 | Wang | F16M 11/10 396/55 |
| 2016/0352992 A1* | 12/2016 | Saika | H04N 5/2328 |
| 2017/0115501 A1* | 4/2017 | Kim | G02B 27/64 |
| 2017/0144771 A1* | 5/2017 | Lukaczyk | B64C 11/00 |
| 2018/0337579 A1* | 11/2018 | Chen | G01B 7/30 |

FOREIGN PATENT DOCUMENTS

| | | | | |
|---|---|---|---|---|
| CN | 104875890 A | | 9/2015 | |
| EP | 2927744 A1 | | 10/2015 | |
| WO | WO-2017090022 A1 * | | 6/2017 | ............ B64D 47/08 |

* cited by examiner

STABILIZING PLATFORM AND CAMERA

CROSS-REFERENCE TO RELATED APPLICATION

This application is a continuation of International Application No. PCT/CN2016/072229, filed on Jan. 26, 2016, the entire contents of which are incorporated herein by reference.

BACKGROUND

A stabilizing platform such as a gimbal may be provided to stabilize a payload, which may include sensors, cargos and/or a device. For example, a payload may comprise a camera that requires stabilization while shooting still photographs or video. A multi-dimensional gimbal may be capable of providing stabilization in more than one dimension by controlling the gimbal in response to a movement of the payload.

Existing approaches for controlling the gimbal motor may not be optimal in some instances. For example, a delay in transmitting motor control instructions from a state measurement device to electronic speed control (ESC) units may cause a delayed control of gimbal motors, which may prevent the gimbal from timely adjusting its attitude according to a state change of the payload.

SUMMARY OF THE DISCLOSURE

Systems and methods are provided for reducing a delay in adjusting gimbal attitude according to information about a payload state measured by a state measurement device, such as an inertial measurement unit (IMU). More than one gimbal motor may be provided in a multi-dimensional gimbal, each of which may be controlled by a corresponding electronic speed control (ESC) unit. One or more ESC units may be on or in the payload (such as a camera) carried by the gimbal to directly control the corresponding gimbal motors based upon the state information of the payload. In some embodiments, one or more ESC units for controlling a pitch motor of the gimbal may be on or in the payload. The one or more ESC units may be provided on the same electrical board with the IMU or may be integrated with the IMU. Various embodiments provided herein enable a real time control of at least the pitch motor of the gimbal to respond to a state change of the payload, thereby reducing a response time of adjusting the attitude of the gimbal and improving the stabilization of payload in response to a change in state of the payload.

An aspect of the disclosure may provide a stabilizing platform for stabilizing a payload, the stabilizing platform comprising: a frame assembly comprising a plurality of frame components movable relative to one another, the frame assembly being configured to support the payload; a plurality of actuators configured to permit the plurality of frame components to move relative to one another, the plurality of actuators comprising a first actuator that is configured to control movement of the payload about a first axis, and a second actuator that is configured to control movement of the payload about a second axis; and a plurality of electronic speed control (ESC) units each electrically coupled to a corresponding actuator of the plurality of actuators in order to control actuation of the plurality of actuators, wherein at least one of the plurality of ESC units is received in the payload.

Aspects of the disclosure may also provide a method of stabilizing a payload, the method comprising: supporting the payload using a frame assembly comprising a frame assembly having a plurality of frame components movable relative to one another; permitting the plurality of frame components to move relative to one another using a plurality of actuators, the plurality of actuators including a first actuator that is configured to control movement of the payload about a first axis, and a second actuator that is configured to control movement of the payload about a second axis; and controlling actuation of the plurality of actuators using a plurality of electronic speed control (ESC) units, each of the plurality of ESC units electrically coupled to a corresponding actuator of the plurality of actuators in order to control actuation of the actuators, wherein at least one of the plurality of ESC units is received in the payload.

Aspects of the disclosure may also provide a movable object, comprising: a body; one or more propulsion units carried by the body and configured to effect a moving of the movable object; and a stabilizing platform of an aspect of the disclosure for stabilizing a payload, the stabilizing platform is configured to stabilize the payload.

Aspects of the disclosure may also provide an imaging system, comprising: an optical camera; a stabilizing platform of an aspect of the disclosure for stabilizing a payload, the stabilizing platform is configured to stabilize the payload.

Aspects of the disclosure may also provide a circuit board, comprising: a substrate configured for supporting and connecting electrical components; a state measurement member supported on the substrate, wherein the state measurement member is configured to measure a state of an object; and at least one electronic speed control (ESC) unit supported on the substrate, wherein the at least one ESC unit is electrically coupled to the state measurement member and a corresponding actuator of a plurality of actuators, the at least one ESC unit is configured to control actuation of the corresponding actuator in response to the state of the object.

Aspects of the disclosure may also provide a method of producing a circuit board, the method comprising: disposing a state measurement member on a substrate, wherein the state measurement member is configured to measure a state of an object; and disposing at least one electronic speed control (ESC) unit on the substrate, wherein the at least one ESC unit is electrically coupled to the state measurement member, and each of the at least one ESC unit is electrically coupled to a corresponding actuator of a plurality of actuators and is configured to control actuation of the corresponding actuator in response to the state of the object.

Aspects of the disclosure may also provide an imaging apparatus, the imaging apparatus comprising: an optical lens for collecting light beams of an object; at least one optical sensor optically coupled to the optical lens and generating an image of the object; and a circuit board of an aspect of the disclosure, wherein the state measurement member is configured to measure a state of the imaging apparatus.

Aspects of the disclosure may also provide an integrated circuit, comprising: an electrical circuit for state measurement, wherein the electrical circuit for state measurement is configured to measure a state of an object; and an electrical circuit for actuator control, wherein the electrical circuit for actuator control is electrically coupled the electrical circuit for state measurement and a corresponding actuator among a plurality of actuators, the electrical circuit for actuator control is configured to control actuation of the corresponding actuator in response to the state of the object.

Aspects of the disclosure may also provide a method of producing an integrated circuit, the method comprising: providing an electrical circuit for state measurement, wherein the electrical circuit for state measurement is configured to measure a state of an object; and providing an electrical circuit for actuator control, wherein the electrical circuit for actuator control is electrically coupled the electrical circuit for state measurement and a corresponding actuator among a plurality of actuators, the electrical circuit for actuator control is configured to control actuation of the corresponding actuator in response to the state of the object.

Aspects of the disclosure may also provide an imaging apparatus, the imaging apparatus comprising: an optical lens for collecting light beams of an object; at least one optical sensor optically coupled to the optical lens and generating an image of the object; and a circuit board supporting the integrated circuit of an aspect of the disclosure, wherein the electrical circuit for state measurement is configured to measure a state of the imaging apparatus.

It shall be understood that different aspects of the disclosure can be appreciated individually, collectively, or in combination with each other. Various aspects of the disclosure described herein may be applied to any of the particular applications set forth below or for any other types of stationary or movable objects. Any description herein of aerial vehicles, such as unmanned aerial vehicles, may apply to and be used for any movable object, such as any vehicle. Additionally, the systems, devices, and methods disclosed herein in the context of aerial motion (e.g., flight) may also be applied in the context of other types of motion, such as movement on the ground or on water, underwater motion, or motion in space.

Other objects and features of the present disclosure will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION OF THE EMBODIMENTS

A payload such as a camera may be carried on a stabilizing platform which can provide stability to the payload during a movement. One example of the stabilizing platform may be a multi-dimensional gimbal which comprises a plurality of gimbal frames driven by gimbal motors. The methods and systems described herein reduce a delay in adjusting gimbal attitude according to state information of a payload carried on the gimbal. The state information of the payload may be measured by a state measurement device such as an inertial measurement unit (IMU) which may be provided with the payload. The operation of the plurality of gimbal motors may be respectively controlled by corresponding electronic speed control (ESC) units which may regulate the rotating speed and direction of corresponding gimbal motor based upon motor control instructions which are generated by the IMU from the measured state information of the payload, such that any change in the state of the payload may be compensated and the payload may thus be stabilized.

In some embodiments, one or more ESC units may be located on or in the payload to directly control the corresponding gimbal motor to reduce a delay in transmitting the motor control instructions from a state measurement device to the ESC units. For instance, one or more ESC units for controlling a pitch motor of the gimbal may be supported by the payload. In some embodiments, the one or more ESC unit may be provided on a same circuit board with the state measurement member or be integrated with the state measurement member. As compared to the conventional ESC configuration in which ESC units are provided separately from the state measurement device and the motor control instructions, which are generated from the measured state information, are transmitted through a signal bus or a twisted-pair cable, systems and methods provided herein may permit the ESC units provided on a common support or integrated into the state measurement member to react more quickly. Due to the merit of ultra-high speed of on-board and on-chip signal transmission, the motor control instructions may be transmitted to the at least one ESC unit on the same circuit board in substantial real time. The ESC unit can actuate the movement of corresponding motor and adjust the gimbal attitude in real time. Therefore, extremely quick or real time stability is provided to the payload. When the payload is a camera, the quality of the captured image and video is improved due to increased stability.

Figure 1:
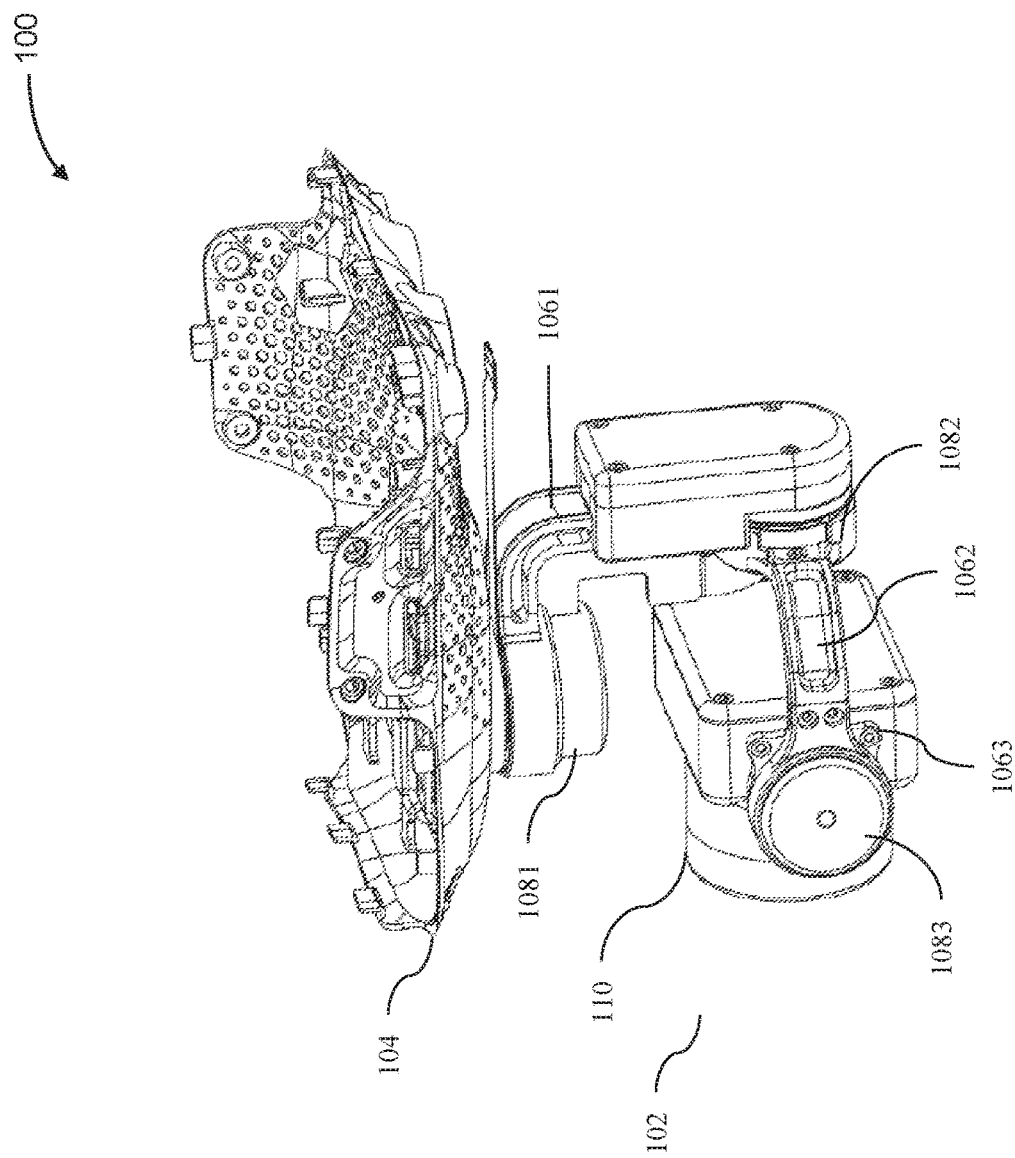
FIG. 1 shows a carrier which includes a stabilizing platform carrying a payload in accordance with an embodiment of the disclosure.

FIG. 1 shows a carrier 100 which comprises a stabilizing platform 102 carrying a payload in accordance with an embodiment of the disclosure. The stabilizing platform 102 such as a gimbal may carry a payload 110 such as a camera. In some embodiments, the carrier may include a support member 104 which supports the payload and being connected to a bearing object, such as an unmanned aerial vehicle (UAV).

The stabilizing platform is supported on a central body of a bearing object such as a UAV. The stabilizing platform is located beneath the central body of the bearing object. The stabilizing platform may be located above or to the side of the bearing object. The stabilizing platform is located beneath one or more arms of the bearing object, and/or between one or more landing supports of the bearing object configured to bear weight of the bearing object when the bearing object is stationary. The stabilizing platform may or may not be supported on one or more extension members of the bearing object such as arms of a UAV. The stabilizing platform may be supported by a housing of the bearing body. The stabilizing platform may be attached to an external surface of the housing the bearing object. The stabilizing platform may be embedded within an external surface of the housing of the bearing body.

The stabilizing platform is directly attached to a bearing object. Alternatively, the stabilizing platform may be attached to a bearing object through the support member. The support member may be connected to the stabilizing platform at one end and to the bearing object at the other end. In some instances, the support member may be fixedly connected to the stabilizing platform and/or the bearing object. For example, the support member may be connected to the stabilizing platform and/or the bearing object through bolts, screws, studs, etc. Alternatively, the support member may be removably connected to the stabilizing platform and/or the bearing object. For example, the support member may be connected to the stabilizing platform and/or the bearing object through one or more interlocking components such as snap fits or quick releases.

The support member has a shape consistent to a portion of the bearing object to which the support member connected. For example, the support member as shown in FIG. 1 has a shape consistent to an UAV body to which it is connected, such that the support member may be connected to the bearing object seamlessly. Alternatively, the support member may not have shape consistent to a portion of the bearing object to which the support member connected.

The support member may permit vibration reduction. For example, the support member may comprise one or more damping elements such as rubber balls or springs to filter out a shock and/or vibration from the bearing object. The support member may prevent some of the vibration or reduce the degree of vibration from the bearing object from reaching the stabilizing platform. The vibration reduction may occur in a vertical direction and/or lateral direction.

The support member may accommodate various electrical or mechanic components which are used to operate the stabilizing platform and/or the bearing object. For example, at least one of a battery pack, a payload controller, a bearing object controller, a communication unit, sensors, a memory, a port, a light, or a navigation system may be received in the support member. The support member may optionally include a housing that may enclose one or more components, such as electrical or mechanical components. The housing may enclose any of the components described. Any of the components may be located on an external surface of the housing, internal surface of the housing, or embedded within the housing. The housing may or may not be fluid tight (e.g., air tight, water tight).

The bearing object bears the weight of the stabilizing platform. The bearing object is located at a terminal end of the stabilizing platform. A support member may or may not be provided between the stabilizing platform and the bearing object. The movement of the bearing object may be independent of the movement of the payload. The bearing object may be a movable object, or a stationery object. The bearing object may be a non-living object or may be a living being (or may be supported by a living being). The movable object may be capable of self-propelled movement (e.g., a vehicle), while the stationary object may not be capable of self-propelled movement. The bearing object may be a handheld object, such as a handheld stabilizer. The bearing object may be carried by a movable object and/or removably attached to a movable object. The movable object may be an unmanned aerial vehicle (UAV). Any description herein of an object, such as a movable object, may apply to any type of movable object, or a stationary object, such as a UAV or any other examples described elsewhere herein, and vice versa. The UAV has one or more propulsion units that may permit the UAV to move about in the air. The UAV may be a rotorcraft. In some instances, the UAV may be a multi-rotor craft that may include a plurality of rotors. The plurality of rotors are capable of rotating to generate lift for the UAV, enabling the UAV to move about freely through the air (e.g., with up to three degrees of freedom in translation and/or up to three degrees of freedom in rotation). The bearing object may be capable of spatial translation (e.g., along, one, two, or three directions) and/or change in orientation (e.g., about one, two, or three axes).

The stabilizing platform may be mounted to the bearing object using a permanent or temporary attachment. The stabilizing platform may be removably attached to the bearing object. The stabilizing platform may be removably attached to a support member, or the support member may be removably attached to the bearing object.

The payload carried by the stabilizing platform may include a device capable of sensing the environment about the movable object, a device capable of emitting a signal into the environment, and/or a device capable of interacting with the environment. One or more sensors may be provided as a payload, and may be capable of sensing the environment. An example of a sensor may be a camera. Any other sensors, such as those described elsewhere herein may be provided as a payload.

In one example, the payload may be a camera. Any description herein of a camera may apply to any type of image capture device, and vice versa. A camera is a physical imaging device. An imaging device can be configured to detect ambient light (e.g., visible, infrared, and/or ultraviolet light) and generate image data based on the detected ambient light. An imaging device includes an image sensor, such as a charge-coupled device (CCD) sensor or a complementary metal-oxide-semiconductor (CMOS) sensor that generates electrical signals in response to wavelengths of light. The resultant electrical signals can be processed to produce image data. The image data generated by an imaging device can include one or more images, which may be static images (e.g., photographs), dynamic images (e.g., video), or suitable combinations thereof. The image data can be polychromatic (e.g., RGB, CMYK, HSV) or monochromatic (e.g., grayscale, black-and-white, sepia). The imaging device may include a lens configured to direct light onto an image sensor.

The camera can be a movie or video camera that captures dynamic image data (e.g., video). A camera can be a still camera that captures static images (e.g., photographs). A camera may capture both dynamic image data and static images. A camera may switch between capturing dynamic image data and static images. Although certain embodiments provided herein are described in the context of cameras, it shall be understood that the present disclosure can be applied to any suitable imaging device, and any description herein relating to cameras can also be applied to any suitable imaging device, and any description herein relating to cameras can also be applied to other types of imaging devices. A camera can be used to generate 2D images of a 3D scene (e.g., an environment, one or more objects, etc.). The images generated by the camera can represent the projection of the 3D scene onto a 2D image plane. Accordingly, each point in the 2D image corresponds to a 3D spatial coordinate in the scene. The camera may comprise optical elements (e.g., lens, mirrors, filters, etc). The camera may capture color images, greyscale image, infrared images, and the like.

The camera may capture an image or a sequence of images at a specific image resolution. In some embodiments, the image resolution may be defined by the number of pixels in an image. In some embodiments, the image resolution may be greater than or equal to about 352×420 pixels, 480×320 pixels, 720×480 pixels, 1280×720 pixels, 1440× 1080 pixels, 1920×1080 pixels, 2048×1080 pixels, 3840× 2160 pixels, 4096×2160 pixels, 7680×4320 pixels, or 15360×8640 pixels. In some embodiments, the camera may be a 4K camera or a camera with a higher resolution.

The camera may capture a sequence of images at a specific capture rate. In some embodiments, the sequence of images may be captured standard video frame rates such as about 24 p, 25 p, 30 p, 48 p, 50 p, 60 p, 72 p, 90 p, 100 p, 120 p, 300 p, 50 i, or 60 i. In some embodiments, the sequence of images may be captured at a rate less than or equal to about one image every 0.0001 seconds, 0.0002 seconds, 0.0005 seconds, 0.001 seconds, 0.002 seconds, 0.005 seconds, 0.01 seconds, 0.02 seconds, 0.05 seconds. 0.1 seconds, 0.2 seconds, 0.5 seconds, 1 second, 2 seconds, 5 seconds, or 10 seconds. In some embodiments, the capture rate may change depending on user input and/or external conditions (e.g. rain, snow, wind, unobvious surface texture of environment).

The camera may have adjustable parameters. Under differing parameters, different images may be captured by the imaging device while subject to identical external conditions (e.g., location, lighting). The adjustable parameter may comprise exposure (e.g., exposure time, shutter speed, aperture, film speed), gain, gamma, area of interest, binning/sub sampling, pixel clock, offset, triggering, ISO, etc. Parameters related to exposure may control the amount of light that reaches an image sensor in the imaging device. For example, shutter speed may control the amount of time light reaches an image sensor and aperture may control the amount of light that reaches the image sensor in a given time. Parameters related to gain controls the amplification of a signal from the optical sensor. ISO controls the level of sensitivity of the camera to available light.

One or more cameras carried by the stabilizing platform can have one or more of the same parameters, characteristics or features. In some instances, all of the cameras carried by the stabilizing platform may have the same characteristics or features. Alternatively, one or more of the cameras carried by the stabilizing platform may have different characteristics or features. In some instances, each of the cameras carried by the stabilizing platform may have different characteristics or features.

The one or more cameras have an optical element, such as a lens, that may be exposed to an environment exterior to the UAV. The optical element may optionally be protected from an environment exterior to the UAV with aid of a cover. The cover may be transparent. The cover may or may not include an optical filter.

Any number of cameras may be provided. For instance, there may be 1 or more, 2 or more, 3 or more, 4 or more, 5 or more cameras supported by the UAV.

The payload includes one or more devices capable of emitting a signal into an environment. For instance, the payload may include an emitter along an electromagnetic spectrum (e.g., visible light emitter, ultraviolet emitter, infrared emitter). The payload includes a laser or any other type of electromagnetic emitter. The payload may emit one or more vibrations, such as ultrasonic signals. The payload emits audible sounds (e.g., from a speaker). The payload emits wireless signals, such as radio signals or other types of signals.

The payload is capable of interacting with the environment. For instance, the payload may include a robotic arm. The payload may include an item for delivery, such as a liquid, gas, and/or solid component. For example, the payload may include pesticides, water, fertilizer, fire-repellant materials, food, packages, or any other item.

The stabilizing platform comprises a frame assembly which may have a plurality of frame components. The frame components are rigid parts. The frame components are configured to move relative to each other. The movement of the frame components may be about a joint, for example the joint may be a hinge, ball and socket, plane joint, saddle, or pivot. Movement of the frame components are affected and controlled by one or more motors. In some instances, one or more motors may be provided at the joints between the frame components. Each frame component may be moved by one motor or a plurality of frame components may be moved by a single motor. Each frame component may rotate about one, two, three, or more axes. Additionally, the frame components may be configured to translate in at least one direction. The joints may further comprise Hall sensors which may detect the position, and/or rotation of the frame components relative to each other at each joint location. The one or more motors, which are provided at the joints between the frame components, may include a first motor 1081, a second motor 1082 and a third motor 1083. In some embodiments, the stabilizing platform may have at least 1, 2, 3, 4, 5, 6, 7, 8, 9, or 10 motors configured to move the frame components relative to each other. Alternatively, the frame components may be moved manually in a design without motors.

Movement of the frame components may be determined relative to a fixed or non-fixed reference frame. For instance, the movement of the frame components may be determined relative to an inertial reference frame, such as an environment within which the bearing object is operating. The movement of the frame component may be determined relative to a non-fixed reference frame, such as the bearing object itself.

The frame assembly may have at least one, two, or three frame components. In some embodiments, the frame assembly may have a first frame component 1061, a second frame component 1062 and a third frame component 1063. The three components may each be configured to rotate the payload along a given axis of rotation. For example, the first frame component rotates about a yaw axis, the second frame component rotates about a roll axis, and the third frame component rotates about a pitch axis. Any of the frame components are configured to rotate about an additional axis. The frame components are additionally configured to translate in at least one dimension.

In some embodiments, the first frame component is directly supported by a bearing object such as a UAV. The first frame component is configured to move about a first axis of rotation, such as yaw axis. The movement of the first frame component about the first axis of rotation is driven and/or controlled by a first motor. The second frame component is directly supported by the first frame component. The second frame component is configured to move about a second axis of rotation, such as a roll axis. The movement of the second frame component about the second axis of rotation is driven and/or controlled by a second motor. A third frame component is directly supported by the second frame component. The third frame component is configured to move about a third axis of rotation, such as a pitch axis. The movement of the third frame component about the third axis of rotation is driven and/or controlled by a third motor. The third frame component is configured to support the payload, such as a camera. Any description of supporting a component (e.g., the payload) includes bearing weight of the component. The third frame component is configured to support the payload in a fixed manner (e.g., the payload may be fixedly attached to the third frame and may not move relative to the third component). Alternatively, the payload is movable relative to the third component. In some instances, the plurality of axes of rotation may be perpendicular to each other. Alternatively, the plurality of axes of rotation may not be perpendicular to each other.

The motor may be an AC or DC motor. Any description herein of a motor may apply to any type of motor or other actuator. Motors may be direct drive motors. Other examples of types of motors may include, but are not limited to brushed or brushless motors, servomotors, switched reluctance motors, stepper motors, or any other types of motors. The motor is powered by an energy source, such as a battery system, onboard or off-board the stabilizing platform. Alternatively, the motor is powered by a power cord connected to an external power source.

The operation of each motor is controlled by an electronic speed control (ESC) unit which is electrically coupled to the motor. An ESC unit can be operably coupled to an electric motor in order to control the operation of the motor, e.g., with respect to rotation speed, rotation direction, acceleration, and/or braking. An ESC unit may be coupled to a motor through a UART (universal asynchronous receiver/transmitter) interface or CAN (controller area network) interface. An ESC unit may be provided in the motor to be regulated. An ESC unit may also be integrated with the motor to be regulated. The ESC unit can regulate the operation of a motor based upon a control instruction. This control can be affected by transmission of control signals (e.g., PPM signals, PWM signals, chopper signals, input port signals, output port signals, etc.) generated and transmitted from the ESC unit to the motor. Conversely, the ESC unit can receive signals from the motor that are indicative of the motor status (e.g., the speed, direction, acceleration, and/or braking of the motor, error or fault information). The ESC may measure operating state parameters of the motor, including the electrical current and a rotor angle with respect to the stator. From the electrical current and the rotor angle, a plurality of operating state parameters of the motor can be calculated, including a q-axis current, d-axis current, a counter electromotive force generated due to a rotation of the rotor, the electrical resistance of the windings, and temperature of the windings.

Each ESC unit can be coupled to a flight control module via a signal line such as a private pulse-position modulation (PPM) signal line that permits control signals to be transmitted from the flight control module to the ESC unit. Additionally, the ESC unit may be configured to transmit information to the flight control module, e.g., information regarding the current operational status of the ESC unit and/or the motor. The flight control module may include one or more processors (such as implemented by a field-programmable gate array (FPGA)) for controlling key operations of the UAV. The flight control module may be supported by a central body of the UAV. The flight control module may provide a signal that may affect the one or more actuators. The signal may be generated on the flight control module. The signal may be generated in response to a command from a user terminal remote to the UAV. The signal may be generated in response to a signal from one or more sensors on-board the UAV. The signal may be generated on the flight control module without requiring user input or active user control.

The ESC units may be provided onboard the carrier. The ESC may be provided onboard any component of the carrier, such as the stabilizing platform and/or the support member. Alternatively, the ESC units may be provided off-board the carrier. The ESC units may be provided on-board the bearing object instead.

The ESC units may be provided onboard the stabilizing platform. In some instances, the ESC units may be provided in the respective frame components. Each one of the ESC units may be housed within the respective frame component. The ESC units may be supported by respective frame components that support or are controlled by a respective motor controlled by the respective ESC unit. For example, the ESC unit for regulating the pitch motor may be housed within the third frame component, the ESC unit for regulating the roll motor may be housed within the second frame component, and the ESC unit for regulating the yaw motor may be housed within the first frame component. Alternatively, more than one ESC unit may be collectively provided within a frame component. For example, the ESC unit for regulating the pitch motor may be housed within the third frame component, and the ESC unit for regulating the roll motor and the ESC unit for regulating the yaw motor may be housed within the second frame component. Alternatively, all the ESC units may be collectively provided within one frame component. For example, all the ESC units may be housed within the second frame component.

In some instances, one or more ESC units are supported by the payload. For instance, one or more ESC units are provided within the payload. One or more ESC units are enclosed within a housing of the payload. For example, the one or more ESC units are attached to an inner surface of a housing of the payload. The one or more ESC units are provided outside the payload. For example, the one or more ESC unit may be attached to an outer surface of a housing of the payload. The one or more ESC unit may be embedded in an outer surface of a housing of the payload. In some instances, the ESC unit for regulating the pitch motor may be provided within the payload. One or more of the other ESC units (e.g., for regulating a yaw motor and/or roll motor) may or may not be supported by the payload. The one or more ESC units may move with the payload. The one or more ESC units may have a fixed position relative to the payload. The one or more ESC units are supported on a same support as a state measurement member. The same support may be a circuit board. Optionally, the state measurement member and the one or more ESC units may be borne by the payload. One, two, three, or more of the ESC members may be borne by the payload.

The ESC units may be provided off-board the stabilizing platform. For instances, the ESC units may be provided on the bearing object such as a UAV. The ESC units may be collectively provided on a circuit board on which other electrical components of the UAV are supported. The ESC units may be separately provided within the body of the UAV, or within arms of the UAV. Alternatively, the ESC units are provided on a support member which supports the payload and connected to the bearing object.

The ESC units may be provided together with the motors. In some instances, an ESC unit is provided with the motor to be regulated within a motor assembly. The ESC unit shares a common support or circuit board with a respective motor assembly.

The ESC unit is provided in a combination of onboard and off-board the stabilizing platform. One or more ESC units are provided on the stabilizing platform, while others may not be provided on the stabilizing platform. For instance, one ESC unit is provided within the payload while others are provided within the UAV body. Any number of ESC's may be provided on any combination of locations, such as the payload, stabilizing platform, support member, and/or bearing object.

The actuation of the motor is controlled by a corresponding ESC unit based upon state information of the payload measured by a state measurement member. The state measurement member may generate motor control instructions from the measured state information of the payload and transmit the generated motor control instructions to the ESC units for motor control. In some instances, the state information of the payload is an attitude of the payload or a change in the state information of the payload. The state measurement member includes any suitable number and combination of inertial sensors, such as at least one, two, three, or more accelerometers, and/or at least one, two, three, or more gyroscopes. Examples of inertial sensors may include, but are not limited to, accelerometers, gyroscopes, gravity-detecting sensors, magnetometers, or any other sensors. Optionally, the state measurement member includes at least one, two, three, or more inertial measurement units (IMU), which each includes any number or combination of integrated accelerometers, gyroscopes, or any other type of inertial sensors. In some embodiments, one-axis, two-axis, or three-axis accelerometers may be provided. Optionally, one-axis, two-axis, or three-axis gyroscopes may be provided. Any number or combination of inertial sensors may be provided to detect state of a component (e.g., payload, frame component, support member, bearing object) about or along a single axis, about or along two axes, or about or along three axes.

The state measurement member may provide sensing data of the payload relative to a single axis of motion. The axis of motion corresponds to an axis of the inertial sensor (e.g., a longitudinal axis). In some embodiments, the state measurement member includes a plurality of inertial sensors, each inertial sensor provides measurements along a different axis of motion. For example, the state measurement member includes three accelerometers so as to provide acceleration data along three different axes of motion. The three directions of motion are orthogonal axes. One or more of the accelerometers are linear accelerometers configured to measure acceleration along a translational axis. Conversely, one or more of the accelerometers are angular accelerometers configured to measure acceleration about a rotational axis. As another example, the state measurement member includes three gyroscopes so as to provide orientation data about three different axes of rotation. The three axes of rotation are orthogonal axes (e.g., roll axis, pitch axis, yaw axis). Alternatively, at least some or all of the inertial sensors may provide measurement relative to the same axes of motion. Such redundancy may be implemented, for instance, to improve measurement accuracy. Optionally, an inertial sensor is capable of providing sensing data relative to a plurality of axes. For example, an IMU including a plurality of integrated accelerometers and gyroscopes is configured to generate acceleration data and orientation data with respect to up to six axes of motion. Alternatively, a single accelerometer can be configured to detect acceleration along multiple axes, and a single gyroscope can be configured to detect rotation about multiple axes.

Various configurations and embodiments of state measurement member can be incorporated described herein. The state measurement member can be microelectromechanical system (MEMS), which is smaller than other types of inertial sensors. Such MEMS state measurement member can be provided as part of an integrated circuit, such as within a chip.

In some embodiments, the state measurement member includes an inertial measurement unit (IMU). The IMU includes a gyroscope, an accelerometer and so on. The state measurement member is fixed to a payload, a carrier or a movable object to measure an acceleration of the payload, carrier or movable object relative to an inertial reference system. Then the information on the speed, attitude angle and position in a navigation coordinate system can be achieved by an integral operation based on the Newton law of inertia.

A state of a component (e.g., payload, frame component, support member, bearing object) may include positional information of the component. This may include spatial location along one, two, or three axes. This may include orientation about one, two, or three axes. This may also include movement information such as linear velocity, angular velocity, linear acceleration, and/or angular acceleration. A state of a component may include information about operation of a component, such as whether the component is on or off, a power level of a component, power usage of a component, errors detected in the component, a communication status of the component or operational parameters of the component. For example, operational parameters of a camera may include an image resolution of the camera, a camera shooting mode, exposure, balance, focus, zoom, or any other function of the camera. A state measurement member may detect any state of the component. A state measurement member may detect positional information of the component.

Figure 2:
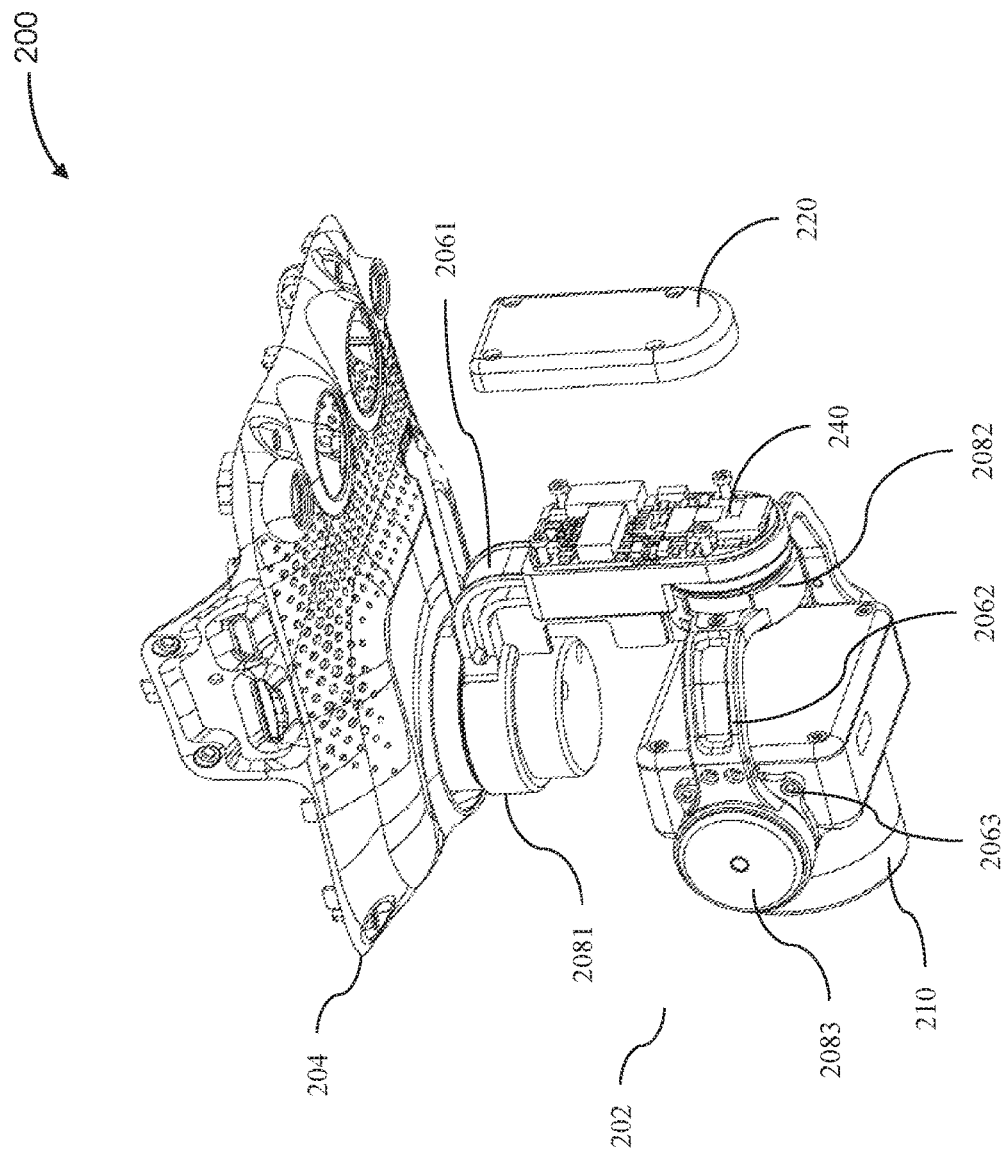
FIG. 2 shows a carrier which comprises a stabilizing platform carrying a payload in accordance with an embodiment of the disclosure.

FIG. 2 shows a carrier 200 which comprises a stabilizing platform 202 carrying a payload 210 in accordance with an embodiment of the disclosure. The stabilizing platform may include a frame assembly which may have at least one, two, or three frame components. In some embodiments, the frame assembly includes a first frame component 2061, a second frame component 2062 and a third frame component 2063.

The three components may each be configured to rotate the payload along a given axis of rotation. In some examples, the first frame component rotates in about a yaw axis, the second frame component may rotate about a roll axis, and the third frame component rotates about a pitch axis. The payload such as a camera may be directly supported by the third frame component.

The movement of the third frame component about the third axis of rotation may be driven and/or controlled by a third motor 2083. The movement of the second frame component about the second axis of rotation may be driven and/or controlled by a second motor 2082. The movement of the first frame component about the first axis of rotation may be driven and/or controlled by a first motor 2081. In some embodiments, the first frame component may be directly supported by a bearing object such as a UAV. Alternatively, the carrier may include a support member 204 which supports the payload and being connected to a bearing object such as an unmanned aerial vehicle (UAV). The support member 204 can be a portion of a bearing object such as a UAV.

In some embodiments, the third ESC unit for regulating an actuation of the third motor about a pitch axis is received in the payload. The second ESC unit for regulating an actuation of the roll axis and the first ESC unit for regulating an actuation of the first motor about the yaw axis are provided outside the payload. In some instances, the second and first ESC units are provided in one of the frame assemblies. Alternatively, the second and first ESC units are respectively provided in the second frame assembly and the first frame assembly. Alternatively, the second and first ESC units are provided in the support member. In some embodiments, the second and first ESC units may be provided in the second frame assembly. For example, the second and first ESC units may be provided on one or two circuit boards which are received in a cavity of the second frame assembly. The cavity of the second frame assembly is sealed by a cover 220. The one or two circuit boards are received in the second frame assembly in an air tight and/or water proof manner.

Figure 3:
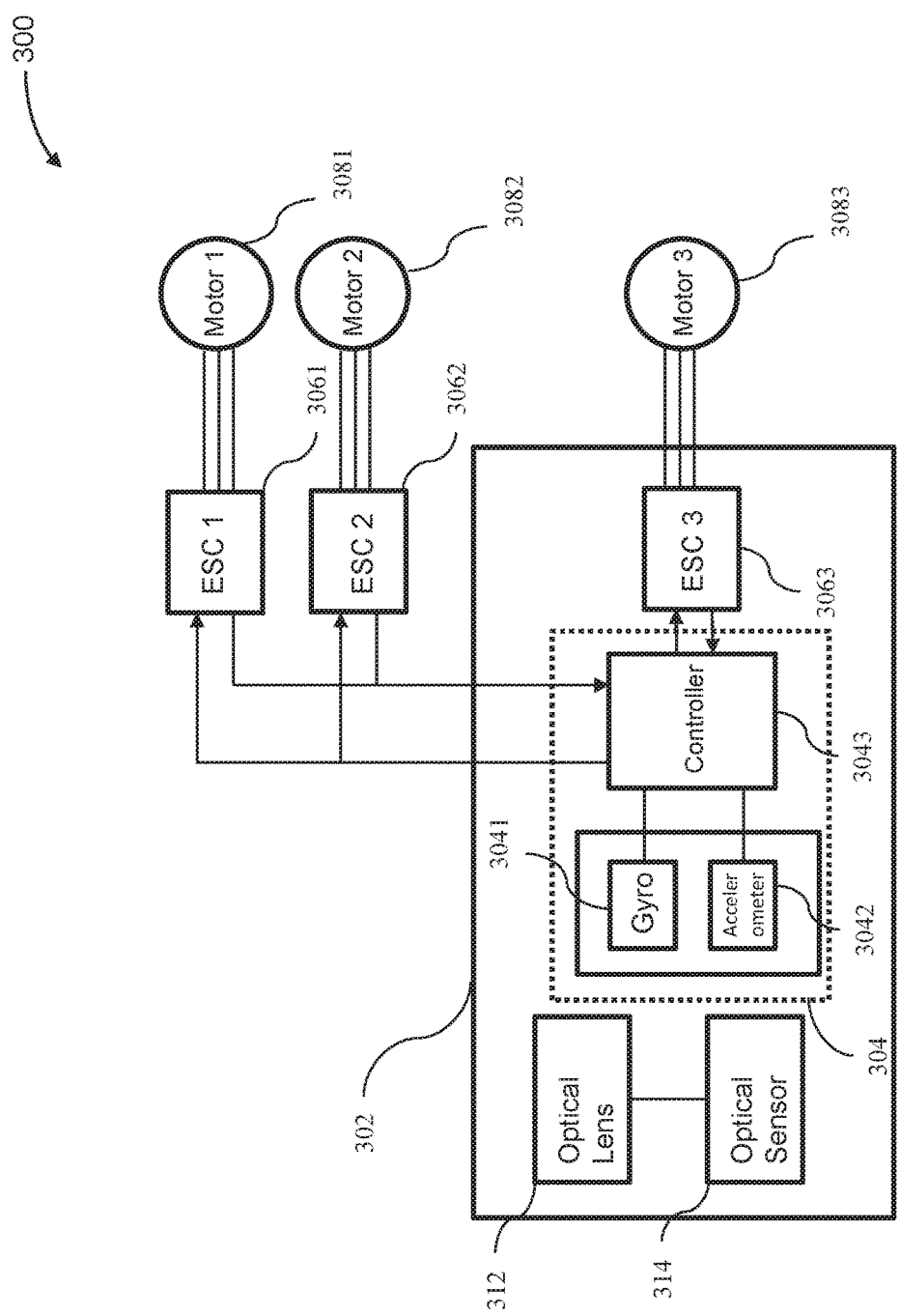
FIG. 3 shows a stabilizing platform which comprises a payload, a plurality of gimbal motors and a plurality of electronic speed control (ESC) units, in accordance with an embodiment of the disclosure.

FIG. 3 shows a stabilizing platform 300 which comprises a payload, a plurality of gimbal motors and a plurality of electronic speed control (ESC) units, in accordance with an embodiment of the disclosure. In the embodiment, the payload 302 is a camera having an optical lens 312 and an optical sensor optically coupled to the optical lens. The payload may comprise a state measurement member 304, such as an IMU, for measuring state information of the payload and generate motor control instruction from the measured state information of the payload. The payload is carried by a stabilizing platform such as a gimbal in accordance with an embodiment of the disclosure. In some embodiments, the stabilizing platform may be a triple-axis gimbal having three gimbal motors 3081, 3082 and 3083 which are respectively controlled by a first ESC unit 3061, a second ESC unit 3062 and a third ESC unit 3063 based upon state information of the payload as measured by the state measurement member.

The state information of the payload may comprise a positional state of the payload and a change thereof. The positional state comprises at least one of a posture of the payload with respect to three different axes of motion, a linear acceleration of the payload along three different axes of motion, or an angular acceleration of the payload about three different axes of motion. The positional state of the payload may also comprise a height, a velocity, ON/OFF of the stabilizing platform on which the payload is supported, ON/OFF of the bearing object such as UAV. In some instance, the state information of the payload may be a combination of any of the positional state and a change thereof as discussed hereinabove.

The state measurement member may be an inertial measurement unit (IMU). The IMU includes a gyroscope 3041, an accelerometer 3042 and an IMU controller 3043. The IMU controller is configured to generate motor control instruction based upon state information of the payload as measured by the gyroscope and the accelerometer. The ESC units may receive the generated motor control instructions, amplify the received motor control instructions, and control a rotation of corresponding gimbal motors, such as a rotating speed and direction of corresponding gimbal motors. The IMU controller may also receive information regarding the current operational status of the ESC units and/or the motors. The IMU is provided in the payload in a fixed manner such that no relative movement occurs during the movement of the payload. The IMU may be rigidly attached to the payload by various fasteners. The fastener may be a screw, a bolt, a stud, a snap fastener, a buckle, a clip, a pin, a hook, a rivet, a staple, a stitch, a strap, a zipper, a press fit, welding, soldering, or a glue. Alternatively, the IMU may be releasably attached to the payload as long as the IMU does not move relative to the payload when it is attached to the payload. The IMU may be directly attached to the payload without an intermediate layer therebetween. Alternatively, the IMU may be attached to the payload with an intermediate layer therebetween. In some instance, the intermediate layer may be a damping element to damp any shock or vibration of the payload during a movement of the payload. The damping element may also function to keep the temperature of the IMU constant so as to improve the measurement accuracy.

The measurement of the accelerometer may be configured to correct the measured attitude of payload from the gyroscope. The gyroscope may measure an angular velocity of the payload to which the gyroscope and the accelerometer are attached. The attitude of the payload may be calculated by performing an integration of the measured angular velocity over time. However, due to a drifting of the gyroscope, an error may be found in the measured attitude of the payload, and this error may accumulate over time. For example, the gyroscope may output an angular velocity even if no angular movement actually occurs. In order to correct the error in the measured attitude of the payload from the gyroscope, the measurement of the accelerometer may be used.

The accelerometer may not suffer from a drifting since it is calibrated in factory. When the UAV travels in a constant velocity or the UAV is stationery, the measurement of the accelerometer may be a vector of gravity under gimbal head coordinate. In addition, the yaw vector of the payload can be calculated from the UAV's attitude and the rotor angles of the motors of the gimbal, where the attitude of the UAV may be measured by a gyroscope provided on the UAV. Then, the payload's attitude with respect to a horizontal plane as a reference plane can be calculated, where the horizontal plane can be represent by the vector of gravity as measured by the accelerometer. Since the calculated attitude of the payload is calculated from the vector of gravity as measured by the accelerometer, no integration may be performed, and thus no drifting error may be found in the calculated attitude of the payload. Therefore, the attitude of the payload, which is calculated from the measurement of the accelerometer, can be configured to correct the measured attitude of the payload by the gyroscope.

The IMU can be provided on a circuit board of the payload. The circuit board can be a printed circuit board (PCB) which mechanically supports and electrically connects with electronic components including the IMU. The circuit board may be rigidly attached to the payload by any fastening means as discussed hereinabove. For example, the circuit board may be rigidly attached to the payload by one or more threaded screws. Alternatively, the PCB board may be attached to the payload with an intermediate layer therebetween. In some instance, the intermediate layer may be a damping element to damp any shock or vibration introduced from the payload.

The damping element can be any element suitable for damping a motion experienced by the PCB board. The motion damped by the damping elements may include one or more of vibrations, oscillations, shaking, or impacts. Such motions may originate from motions of the payload that are transmitted to the PCB board. The damping element may provide motion damping by isolating the PCB board from the source of unwanted motion by dissipating or reducing the amount of motion transmitted to the PCB board. The damping element may reduce the magnitude (e.g., amplitude) of the motion that would otherwise be experienced by the PCB board, such as by greater than or equal to approximately 10%, 20%, 30%, 40%, 50%, 60%, 70%, 80%, 90%, or 100%. In some instances, the damping element can be configured to reduce motions having certain frequencies. For example, some damping elements can reduce high frequency motions, while other damping elements can reduce low frequency motions. A damping element can damp motions having frequencies greater than or equal to about 0.5 Hz, 1 Hz, 5 Hz, 10 Hz, 20 Hz, 30 Hz, 40 Hz, 50 Hz, 100 Hz, 200 Hz, 300 Hz, 400 Hz, 500 Hz, 600 Hz, 700 Hz, 800 Hz, 900 Hz, or 1000 Hz. Alternatively, a damping element can damp motions having frequencies less than or equal to about 0.5 Hz, 1 Hz, 5 Hz, 10 Hz, 20 Hz, 30 Hz, 40 Hz, 50 Hz, 100 Hz, 200 Hz, 300 Hz, 400 Hz, 500 Hz, 600 Hz, 700 Hz, 800 Hz, 900 Hz, or 1000 Hz. The motion damping applied by the damping element may improve the quality of IMU measurement, such as by reducing the amount of noise and/or measurement drift of the sensors on PCB board, as well as by increasing the accuracy, precision, responsiveness, and/or stability of the sensors on the PCB board.

The damping elements described herein can be formed from any suitable material or combination of materials, including solid, liquid, or gaseous materials. The materials used for the damping elements may be compressible and/or deformable. For example, the damping element can be a sponge, foam, rubber material, gel, and the like. Alternatively or in addition, the damping element can include piezoelectric materials or shape memory materials. The damping element can include one or more mechanical elements, such as springs, pistons, hydraulics, pneumatics, dashpots, shock absorbers, isolators, and the like. The properties of the damping element can be selected so as to provide a predetermined amount of motion damping. For example, the damping element may have a characteristic stiffness, which may correspond to a Young's modulus of the damping element. The Young's modulus may be greater than or equal to approximately 0.01 GPa, 0.05 GPa, 0.1 GPa, 0.2 GPa, 0.3 GPa, 0.4 GPa, 0.5 GPa, 0.6 GPa, 0.7 GPa, 0.8 GPa, 0.9 GPa, 1 GPa, or 5 GPa. Alternatively, the Young's modulus may be less than or equal to approximately 0.01 GPa, 0.05 GPa, 0.1 GPa, 0.2 GPa, 0.3 GPa, 0.4 GPa, 0.5 GPa, 0.6 GPa, 0.7 GPa, 0.8 GPa, 0.9 GPa, 1 GPa, or 5 GPa. In some instances, the damping element may have viscoelastic properties. The properties of the damping element may be isotropic or anisotropic. For instance, the damping element may provide motion damping equally along all directions of motion. Conversely, the damping element may provide motion damping only along a subset of the directions of motion (e.g., along a single direction of motion).

The IMU or the circuit board supporting the IMU may be attached to an interior of the payload. For example, the IMU or the circuit board supporting the IMU may be attached to an inner surface of a housing of the payload. Alternatively, the IMU or the circuit board supporting the IMU may be attached to an exterior of the payload. For example, the IMU or the circuit board supporting the IMU may be attached to an outer surface of a housing of the payload. In this case, an additional cover may be provided to encapsulate the IMU or the circuit board to prevent any damage from dust or humidity.

At least one ESC unit among the plurality may be provided together with the IMU, such that the at least one ESC unit may receive motor control instructions generated from the IMU controller which generates the motor control instructions based upon the measured state information. An ESC unit may include an amplifier for amplifying the received motor control instructions and a controller for regulating a rotation of a corresponding gimbal motor, such as a rotating speed and direction of the gimbal motor. In some embodiments, the at least one ESC unit may be provided on the same circuit board with the IMU, such that the motor control instructions may be received by the at least one ESC unit much faster as compared to a situation where the motor control instructions are transmitted to an ESC unit through a signal bus or a twisted-pair cable. The circuit board may be a PCB board. The signal may be transmitted from the IMU to the at least one ESC unit via pads and tracks which are made of material having higher conductivity, such as gold, silver or copper. The signal velocity on a PCB board may be fast. For example, the signal can be transmitted on a PCB with a velocity of at least 100 ps/inch, 120 ps/inch, 130 ps/inch, 140 ps/inch, 150 ps/inch or 160 ps/inch, as compared with the data transmission delay through external physical port which might be 128 μs at a Baud rate of 1.56 Mbps.

The one or more ESC units can be provided in proximity to the IMU on the circuit board such that electrical connections, such as the pads or tracks, may have a short length. A distance between the at least one ESC unit and the IMU may be less than or equal to approximately 20 microns, 50 microns, 100 microns, 200 microns, 500 microns, 1 mm, 2 mm, 3 mm, 4 mm, 5 mm, 6 mm, 7 mm, 8 mm, 9 mm, 10 mm, 12 mm, 14 mm, 16 mm, 18 mm, 20 mm, 25 mm, 30 mm, 35 mm, 40 mm, 45 mm, or 50 mm. A time in signal transmission from the IMU to the at least one ESC unit may be less than or equal to approximately 0.1 ps, 0.5 ps, 1 ps, 5 ps, 10 ps, 15 ps, 20 ps, 25 ps, 30 ps, 35 ps, 40 ps, 45 ps, 50 ps, 55 ps, 60 ps, 65 ps, 70 ps, 75 ps, 80 ps, 85 ps, 90 ps, 95 ps, 100 ps, 150 ps, 200 ps, 250 ps, 300 ps, 400 ps, 500 ps, 600 ps, 700 ps, 800 ps, 900 ps or 1 ns.

Alternatively, the at least one ESC unit may be integrated with the IMU. For example, the at least one ESC unit and the IMU may be encapsulated and produced as one integrated circuit or one processor such that the signal transmission is even faster. Meanwhile, other ESC units, which are not provided in the payload together with the IMU, may receive motor control instructions from the IMU controller via a signal bus. The data transmission delay on the internal data bus of the integrated circuit may be less than 1 μs. In some instances, the at least one ESC unit may be integrated with the IMU in one package, the one package being configured to perform a complete function such that an attempt to separate the at least one ESC unit or the IMU from the one package will destroy functioning of the one package.

Alternatively, only the amplifier of the at least one ESC unit, which receiving and amplifying the motor control instructions, may be integrated with the IMU, while the controller of the at least one ESC unit, which regulating a rotation of a corresponding gimbal motor, may be provided with the gimbal motor. In this configuration, the motor control instructions generated by the IMU from the measured state information of the payload can be transmitted to the amplifier of the ESC unit in an on-chip manner, and the amplified motor control instructions can then be provided to the controller of the ESC unit to regulate a rotation of a corresponding gimbal motor.

The at least one ESC unit provided in the payload together with the IMU, as well as other ESC units which are not provided in the payload together with the IMU, may then control the actuation of a corresponding motor based upon the received motor control instructions, so as to adjust an attitude of the gimbal and stabilize the payload carried on the gimbal. The payload may be stabilized in all three dimensions (e.g., yaw, roll and pitch) based upon the received motor control instructions, with in at least one direction being stabilized faster than in other directions. In other words, in at least one direction which corresponds to the ESC unit being received in the payload together with the IMU, the payload may be stabilized with less response time as compared in other directions. In some examples, the payload may be stabilized in the at least one direction in a substantially real time manner.

The ESC unit may measure operating state parameters of the motor, including the electrical current in two windings out of the three windings and a rotor angle with respect to the stator. From the electrical current in two windings and the rotor angle, a plurality of operating state parameters of the motor can be calculated, including a q-axis current, d-axis current, a counter electromotive force generated due to a rotation of the rotor, the electrical resistance of the windings, and temperature of the windings, as discussed hereinabove. The ESC unit may send the measured operating state parameters of the motor to the IMU as feedback. The IMU may generate a motor control instruction, in addition to measuring the state information of the payload. In some instances, the IMU may change the motor control instruction based upon the operating state parameters received from the ESC unit. For instance, the IMU may determine if the motor is to be shut down to avoid overheating.

In some examples, the payload may be a camera. The camera may be stabilized in all three dimensions (e.g., yaw, roll and pitch), so that the image collected remains smooth while payload experiencing vibration or shock. Meanwhile, in at least the pitch direction, the camera may be stabilized in a substantially real time manner, so as to avoid any vibration in pitch direction which may deteriorate the image quality most.

The one or more ESC unit and the IMU may be provided in the payload. Optionally, the one or more ESC unit and the IMU may be provided outside the payload. For example, the ESC unit and the IMU (which includes the gyroscope, the accelerometer and the IMU controller) may be rigidly attached to an interior or exterior surface of the payload, and the at least one ESC unit may receive the motor control instructions, which are generated by the IMU controller based upon the measured state information of the payload, with less transmission delay as compared to the other ESC units which are not provided together with the IMU because the on-PCB signal transmission is much faster.

More than one ESC unit may be provided together with the IMU, either in the payload or outside the payload. For example, the more than one ESC unit may be provided on the same circuit board with the IMU or may be integrated with the IMU, so as to receive the motor control instructions from the IMU controller of the IMU with less transmission delay as compared to a situation where the motor control instructions are transmitted to an ESC unit through a signal bus or a twisted-pair cable. The corresponding gimbal motors may be regulated by the more than one ESC unit in response to the motor control instructions with less response time, such that the payload may be stabilized in more than one direction in substantially real time.

The ESC unit may be provided in proximity to the motor to be regulated. In some instance, the ESC unit may be provided in proximity to the motor to be regulated in order to shorten a signal transmission route and therefore reduce a delay in signal transmission from the ESC unit to the motor. A length of electrical path between the ESC unit to the motor to be regulated by the ESC unit may be less than 1 mm, 5 mm, 10 mm, 15 mm, 20 mm, 25 mm, 30 mm, 35 mm, 40 mm, 45 mm, 50 mm, 55 mm, 60 mm, 65 mm, 70 mm, 75 mm, 80 mm, 85 mm, 90 mm, 95 mm, 100 mm, 150 mm, 200 mm, 250 mm or 300 mm. A time in signal transmission from the ESC unit to the motor may be less than 1 ps, 10 ps, 50 ps, 100 ps, 200 ps, 400 ps, 600 ps, 800 ps, 1 ns, 50 ns, 100 ns, 200 ns, 400 ns, 600 ns, 800 ns, 1 µs, 10 µs, 50 µs, 100 µs, 200 µs, 400 µs, 600 µs, 800 µs, 1 ms, 10 ms, 50 ms, 100 ms, 200 ms, 400 ms, 600 ms, 800 ms or 1 s. The less time required to transmit signal from the ESC unit to the motor may allow the payload being stabilized with less delay in response to the state information of the payload, substantially in a real time manner. In case the payload is a camera, the quality of the captured image and video may be improved.

Figure 4:
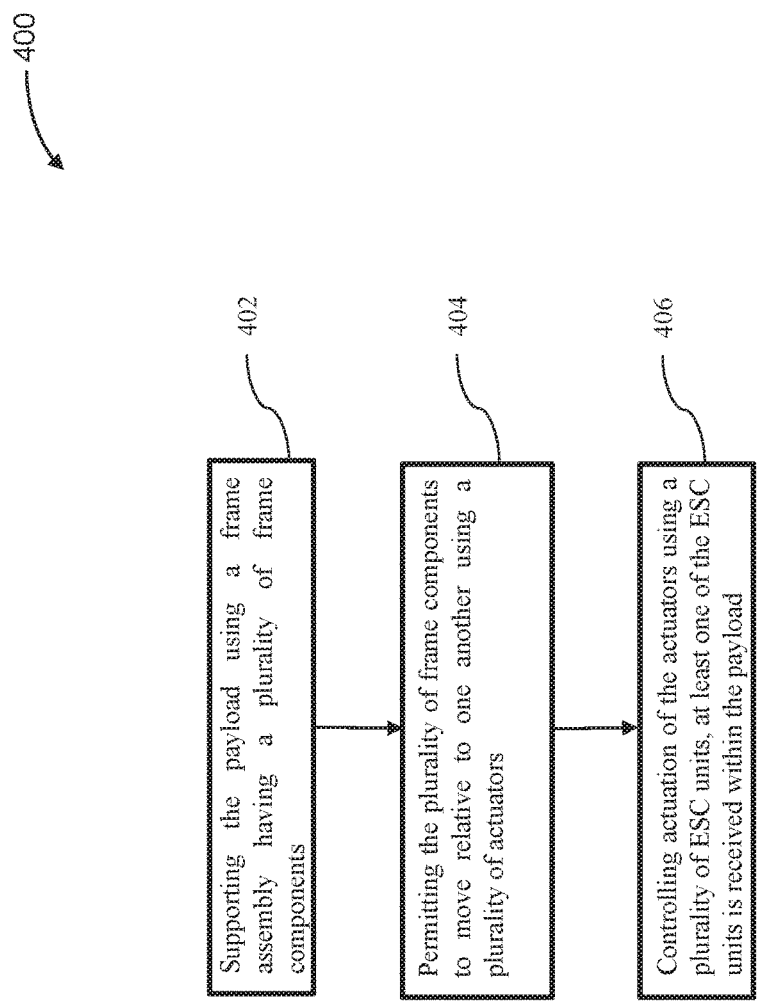
FIG. 4 is a flow chart illustrating a method of stabilizing a payload, in accordance with an embodiment of the disclosure.

FIG. 4 is a flow chart illustrating a method 400 of stabilizing a payload, in accordance with an embodiment of the disclosure.

In process 402, the payload may be supported using a frame assembly comprising a frame assembly having a plurality of frame components movable relative to one another. In process 404, the plurality of frame components may be permitted to move relative to one another using a plurality of actuators, the plurality of actuators including a first actuator that is configured to control movement of the payload about a first axis, and a second actuator that is configured to control movement of the payload about a second axis.

The frame assembly may comprise one, two, three or more frame components which are configured to move relative to each other about a joint, such that the payload may be moved and stabilized in one, two, three or more dimensions. The movement of the frame components may be effected and controlled by one or more actuators (e.g., motors) which are provided at the joints between the frame components. In some instances, the frame assembly may comprise at least two frame components such that the payload may be moved and stabilized in at least two dimensions or directions. For example, the first frame assembly may be permitted to rotate about a first axis by a first motor, and the second frame assembly may be permitted to rotate about a second axis by a second motor. The first axis may be perpendicular to the second axis. In some embodiments, the first axis may be a pitch axis. The second axis may be a roll axis or a yaw axis.

The payload such as a camera is rigidly attached to the frame assembly. In some embodiments, the payload is attached to an innermost frame component of the frame assembly. In some embodiments, the innermost frame component may permit the payload to rotate about a pitch axis.

In process 406, the actuation of the plurality of actuators may be controlled using a plurality of electronic speed control (ESC) units, each of the plurality of ESC units may be electrically coupled to a corresponding actuator of the plurality of actuators in order to control actuation of the actuators, wherein one or more of the plurality of ESC units may be received in the payload.

The movement and operation (e.g., rotation speed, rotation direction, acceleration, and/or braking) of the motors may be respectively controlled by a corresponding ESC unit which may regulate based upon motor control instructions. The motor control instructions can be generated by the state information member from state information of the payload or a change thereof measured by state information member such as an IMU. In some instances, the IMU may be rigidly attached to the payload to measure the state of the payload.

In some embodiments, one or more ESC units from a plurality may be provided together with the IMU to facilitate a fast signal transmission from the IMU to the at least one ESC unit. For example, the one or more of ESC unit is provided on the same circuit board with the IMU. The IMU controller of the IMU may generate motor control instructions based upon the measured state information of the payload. The measured state information of the payload is transmitted from the gyroscope and the accelerometer to the IMU controller in an on-chip manner, and the generated motor control instructions is transmitted to the at least one ESC unit in an on-board manner, which is much faster as compared to a situation where the motor control instruction is transmitted to an ESC unit through a signal bus or a twisted-pair cable. For another example, the at least one ESC unit may be integrated with the IMU. The at least one ESC unit and the IMU may be received in the payload or outside the payload.

Figure 5:
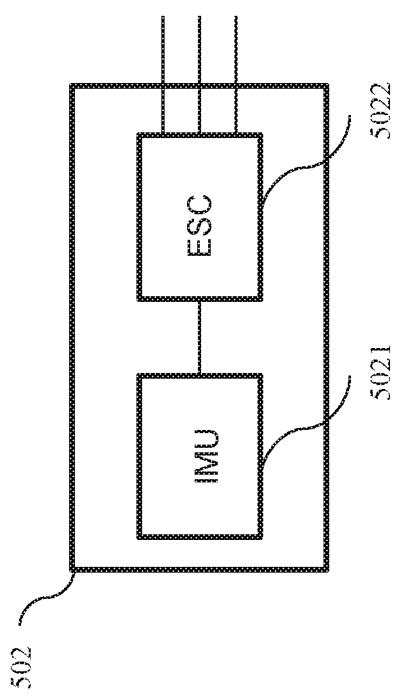
FIG. 5 shows a schematic of a circuit board on which at least a state measurement device and an ESC unit are provided, in accordance with an embodiment of the disclosure.

FIG. 5 shows a schematic of a circuit board 502 on which at least a state measurement device 5021 and an ESC unit 5022 are provided, in accordance with an embodiment of the disclosure. The circuit board may be attached to an object to measure state information of the payload and a change thereof. The object can be a moveable object such as a vehicle, or a handheld object. The state measurement device can be an IMU which includes a gyroscope, an accelerometer and an IMU controller. The IMU may generate motor control instructions for motor control based upon measured state information of the payload from the gyroscope and accelerometer. The IMU controller may also receive information regarding the current operational status of the ESC units and/or the motors.

In some embodiments, at least one ESC unit, among the plurality for controlling gimbal motors of a stabilizing platform, may be provided on the circuit board with a state measurement device such as an IMU. The IMU may generate state information member from state information of the object as measured, and may transmit the generated state information member to the at least one ESC unit, and then, the at least one ESC unit may control an exterior actuator such as a motor according to the state information member. In some examples, the at least one ESC unit may be the ESC unit for controlling the pitch motor of the gimbal. The information on the speed, attitude angle and position in a navigation coordinate system of the payload may be achieved from the IMU measurements.

The circuit board may comprise a substrate to support the at least one ESC unit and the IMU. The substrate may be a printed circuit board (PCB). The PCB may mechanically support and electrically connect electronic components using conductive tracks, pads and other features etched from copper sheets laminated onto a non-conductive substrate. The PCB may be single sided, double sided or multi-layered. The signal transmission velocity onboard the PCB may be much faster than that of a signal bus or a twisted-pair cable. For example, the signal delay of data transmission on a PCB can be less than 1 µs, as compared with the data transmission delay through external physical port which might be 128 µs at a Baud rate of 1.56 Mbps over a signal bus or a twisted-pair cable.

The PCB board supporting the IMU and at least one ESC unit may be rigidly attached to an interior of the payload. For example, the PCB board may be attached to an inner surface of a housing of the payload. Alternatively, the PCB board may be attached to an exterior of the payload. For example, the PCB board may be attached to an outer surface of a housing of the payload. Various means may be possible to ensure a rigidity of a connection between the PCB board and the payload, such as a screw, a bolt, a stud, a welding or a glue. In some examples, the PCB board may be rigidly attached to the payload by a plurality of screws.

The PCB board may be directly attached to the payload or through an intermediate layer. For example, the intermediate layer may be a damping element (e.g., a shock absorption layer or a vibration dampening pad) to damp any shock of the payload. The damping element may also function to keep the temperature of the IMU constant so as to improve the measurement accuracy. The damping element can be any element suitable for damping a motion experienced by the PCB board, and can be formed from any suitable material or combination of materials, including solid, liquid, or gaseous materials, as discussed hereinabove.

In some embodiments, the at least one ESC unit may be integrated with the IMU as one chip, which may affect an even faster signal transmission. For example, the electrical circuit of the at least one ESC unit may be provided with the electrical circuit of the IMU within the same integrated circuit package. In some instances, the computer executable instructions, which are configured to implement the functionality of the at least one ESC unit, may be integrated with the computer executable instructions, which are configured to implement the functionality of the IMU. The at least one ESC unit may receive the motor control instructions, which are generated from measured state information of the payload, in substantially real time and then regulate the operation of corresponding motor. The fast signal transmission from the IMU to the at least one ESC unit may mean a fast control to gimbal motor with less delay and a substantially real time adjusting to the gimbal attitude. In a configuration where the at least one ESC unit is integrated with the IMU as one chip, once the state information of the payload is measured by the IMU and corresponding motor control instruction is generated by the IMU, the motor control instruction can be sent to the at least one ESC unit without any external data transmission over a physical port such as a UART or a CAN. In some instances, the computer executable instructions configured to implement the functionality of the IMU may generate a motor control instruction based upon the measured state of the payload, and send the motor control instruction to the computer executable instructions configured to implement the functionality of the at least one ESC unit through internal data bus. The data transmission delay on the internal data bus may be less than 1 us, as compared with the data transmission delay through external physical port which might be 128 us at a Baud rate of 1.56 Mbps.

Figure 6:
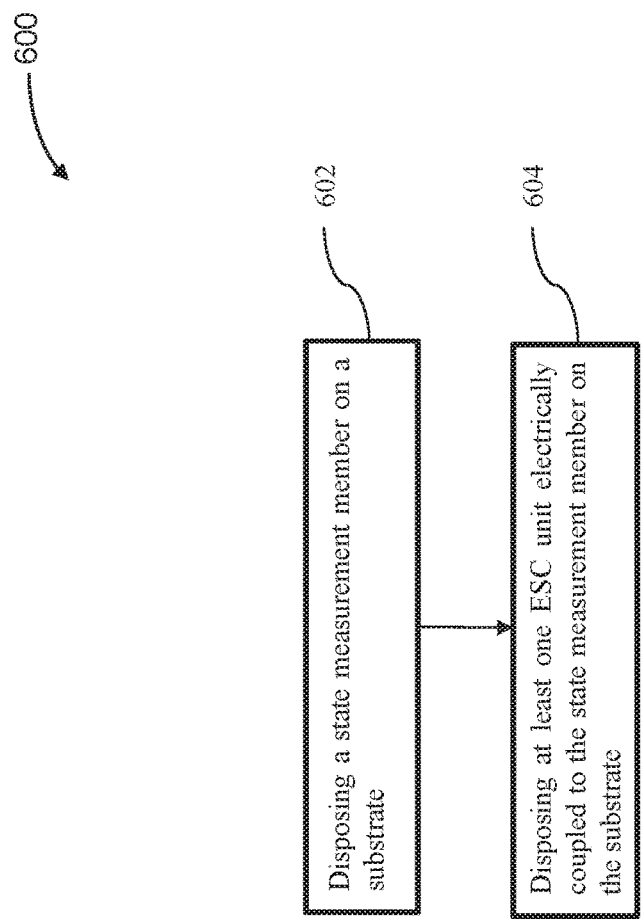
FIG. 6 is a flow chart illustrating a method of producing a circuit board, in accordance with an embodiment of the disclosure.

FIG. 6 is a flow chart 600 illustrating a method of producing a circuit board, in accordance with an embodiment of the disclosure. A circuit board such as the one illustrated in FIG. 5 may be produced by this method.

In process 602, a state measurement member may be disposed on a substrate, the state measurement member being configured to measure a state of an object. The substrate may be provided as a PCB board. In some embodiments, the state measurement member may be an IMU which may include any number or combination of integrated accelerometers and gyroscopes. The IMU may provide linear acceleration data along three different axes of motion, angular acceleration data about three different axes of motion, and orientation data about three different axes of rotation.

The IMU may be soldered to the PCB board. An example of the soldering process may be a wave soldering, a reflow soldering, or a laser soldering. The PCB board may be single sided, double sided or multi-layered. In addition to the IMU, various electrical components of the payload may be supported on the PCB board, such as an optical sensor, a payload controller, sensors, memories, ports, one or more ESC units, communication unit, heat dissipater, etc.

The PCB board may be rigidly attached to the payload by fasteners such as a bolt, a screw or a stud. A damping element may be interposed between the PCB board and the payload to damp any shock or vibration introduced from the payload. The PCB board may be received in the payload. The PCB board may be provided in any shape suitable to be accommodated in the payload. In some instances, the PCB board may be attached to an interior face of the payload to avoid any vibration thereof relative to the payload. For example, in case the payload is a camera, the PCB board may be attached to a rear cover of the camera.

In process 604, at least one electronic speed control (ESC) unit may be disposed on the substrate. The at least one ESC unit may be electrically coupled to the state measurement member. Each of the at least one ESC unit may be electrically coupled to a corresponding actuator of a plurality of actuators, and may be configured to control actuation of the corresponding actuator according to the state of the object.

The at least one ESC unit may be provided in proximity to the state measurement member such as IMU on the circuit board. The signal transmission velocity onboard the PCB may be much faster than that of a signal bus or a twisted-pair cable, such that a smaller delay may be found in transmitting motor control instructions, which are generated from the measured state information of the payload, to the at least one ESC unit. For example, the signal can be transmitted on a PCB with a velocity of 140 ps/inch. The fast signal transmission from the IMU to the at least one ESC unit may mean a fast control to gimbal motor with less delay and a substantially real time adjusting to the gimbal attitude. In other words, the payload may be stabilized in response to a change in state of the payload in a substantially real time manner. In some embodiments, the at least one ESC unit may be the ESC unit for controlling the pitch motor of the gimbal, such that the payload may be stabilized in a substantially real time manner at least in the pitch axis. In case the payload is a camera, the quality of the captured image and video may be improved because the aerial photography image may be deteriorated in a pitch direction most due to a vibration of the bearing object such as a UAV.

More than one ESC unit may be provided on the PCB with the IMU. The corresponding gimbal motors may be regulated by the more than one ESC unit in response to the motor control instructions as received from the IMU with less response time, such that the payload may be stabilized in more than one direction in substantially real time.

Figure 7:
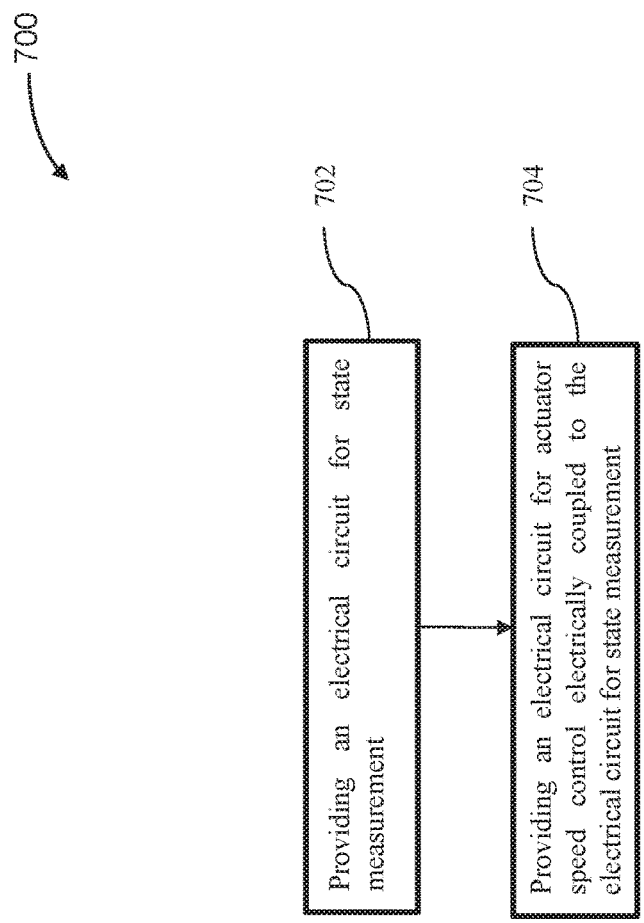
FIG. 7 is a flow chart illustrating a method of producing an integrated circuit, in accordance with an embodiment of the disclosure.

FIG. 7 is a flow chart 700 illustrating a method of producing an integrated circuit, in accordance with an embodiment of the disclosure.

In process 702, an electrical circuit for state measurement may be provided, the electrical circuit for state measurement being configured to measure a state of an object. In some instances, the electrical circuit for state measurement may be provided to implement the functionality of an IMU which may include any number or combination of integrated accelerometers and gyroscopes. The electrical circuit for state measurement may provide linear acceleration data along three different axes of motion, angular acceleration data about three different axes of motion, and orientation data about three different axes of rotation.

In process 704, an electrical circuit for actuator speed control may be provided. The electrical circuit for actuator speed control may be electrically coupled to the electrical circuit for state measurement and at least one actuator. The electrical circuit for actuator speed control may be configured to control actuation of the at least one actuator according to the state of the object. In some instances, the electrical circuit for actuator speed control may be provided to implement the functionality of at least one electronic speed control (ESC) unit. Each of the at least one ESC unit may be electrically coupled to a corresponding actuator of a plurality of actuators, and may be configured to control actuation of the corresponding actuator according to the state of the object.

In some instance, the integrated circuit may comprises computer readable medium which stores computer executable instructions. The computer executable instructions may comprise computer executable instructions that, when executed, to implement the functionality of the electrical circuit for state measurement, and computer executable instructions that, when executed, to implement the functionality of electrical circuit for actuator speed control.

The signal transmission velocity between the electrical circuit for state measurement/motor control instruction generation and the electrical circuit for actuator speed control may be much faster than that of a signal bus or a twisted-pair cable, such that a smaller delay may be found in transmitting the motor control instructions to the electrical circuit for actuator speed control. For example, the motor control instruction can be transmitted to the electrical circuit for motor speed control in less than 1 µs. In some examples, the fast signal transmission within the integrated circuit may mean a fast control to gimbal motor with less delay and a substantially real time adjusting to the gimbal attitude. In other words, the payload may be stabilized in response to a change in state of the payload in a substantially real time manner. In some embodiments, the integrated circuit may be provided to control the pitch motor of the gimbal, such that the payload may be stabilized in a substantially real time manner at least in the pitch axis. In case the payload is a camera, the quality of the captured image and video may be improved because the aerial photography image may be deteriorated in a pitch direction most due to a vibration of the bearing object such as a UAV.

More than one electrical circuit for actuator speed control may be provided in the integrated circuit. The corresponding gimbal motors may be regulated by the more than one electrical circuit for actuator speed control in response to motor control instructions as received from the electrical circuit for state measurement/motor control instruction generation with less response time, such that the payload may be stabilized in more than one direction in substantially real time.

Figure 8:
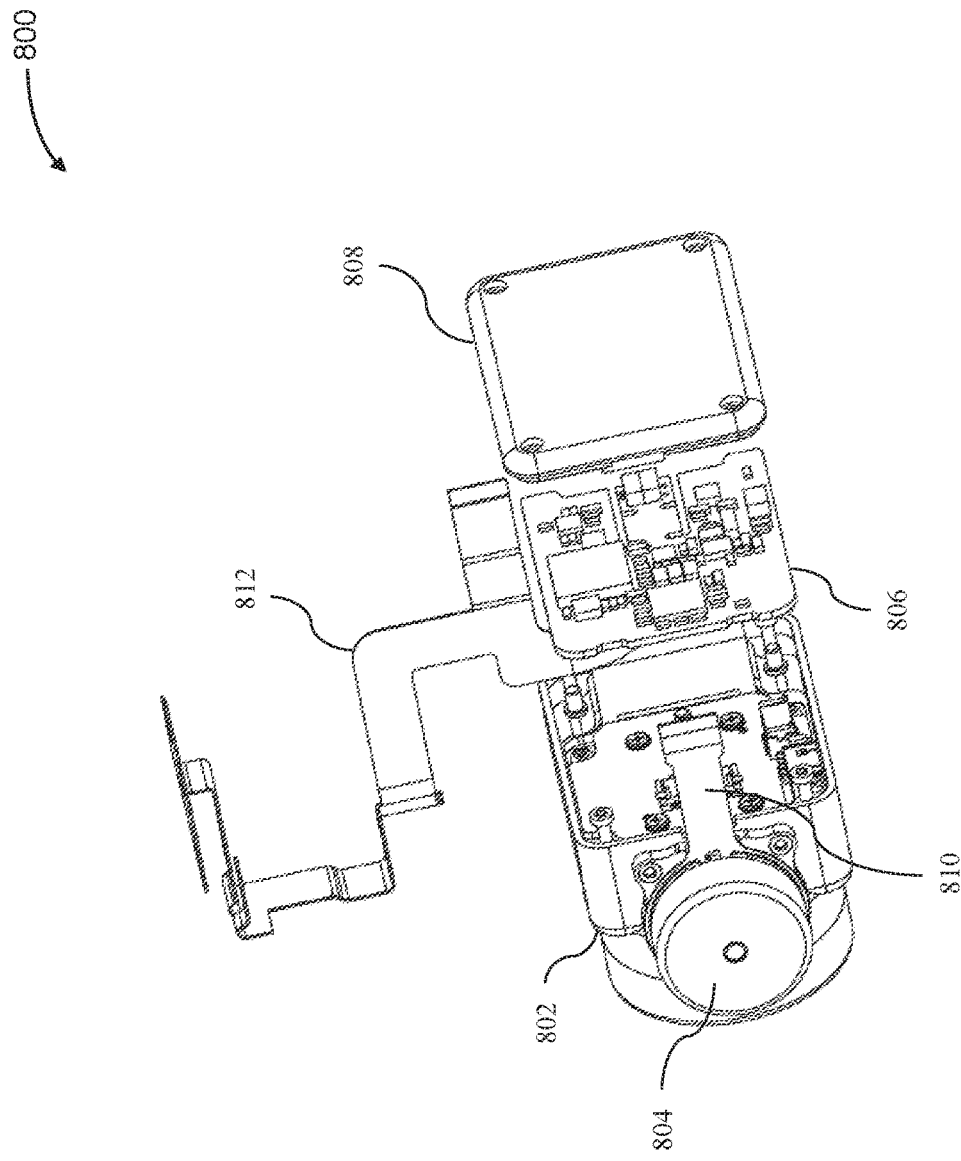
FIG. 8 is an exploded view illustrating an imaging device in accordance with an embodiment of the disclosure.

FIG. 8 is an exploded view illustrating an imaging device 800 in accordance with an embodiment of the disclosure.

In some embodiments, a body 802 of an imaging device 800 may be directly attached to a motor 804 of a gimbal. In some embodiments, the motor to which the image device is attached may be a pitch motor which permits the imaging device to move about a pitch axis. In some examples, the imaging device may be a camera. In this configuration, since the imaging device is directly attached to the pitch motor of the gimbal through no frame component, a weight of the entire stabilizing platform may be reduced. Alternatively, the imaging device may be attached to a frame component and the frame component may be attached to the pitch motor.

A circuit board 806 may be received in the camera body and sealed by a rear cover 808 of the camera. The circuit board may be received in the camera body in an air tight and water-proofing manner. The circuit board may support thereon an IMU and at least one ESC unit. The circuit board may be a PCB board as discussed hereinabove with reference to FIG. 5.

In some embodiments, the pitch motor control instruction, which is generated by the IMU based upon measured state information, may be transmitted to the pitch motor through a first coupling line 810, and to other ESC units through a second coupling line 812. In some examples, the first coupling line and the second coupling line may be a Flexible Printed Circuit (FPC). The first coupling line may be connected to the at least one ESC unit at one end, and connected to the gimbal motor at the other end. In some examples, the first coupling line may transmit the pitch motor control instruction from the at least one ESC unit to the pitch motor. In some instance, the first coupling line may be connected to the at least one ESC unit through a socket on the PCB board. This configuration may prevent the first coupling line from winding or folding during a rotation of the camera about the pitch axis, because the first coupling line rotates together with the imaging device and the stator of the pitch motor during the imaging device's rotation about the pitch axis. In some embodiments, the second coupling line 812 also can transmit image signal obtained by the image device.

Figure 9:
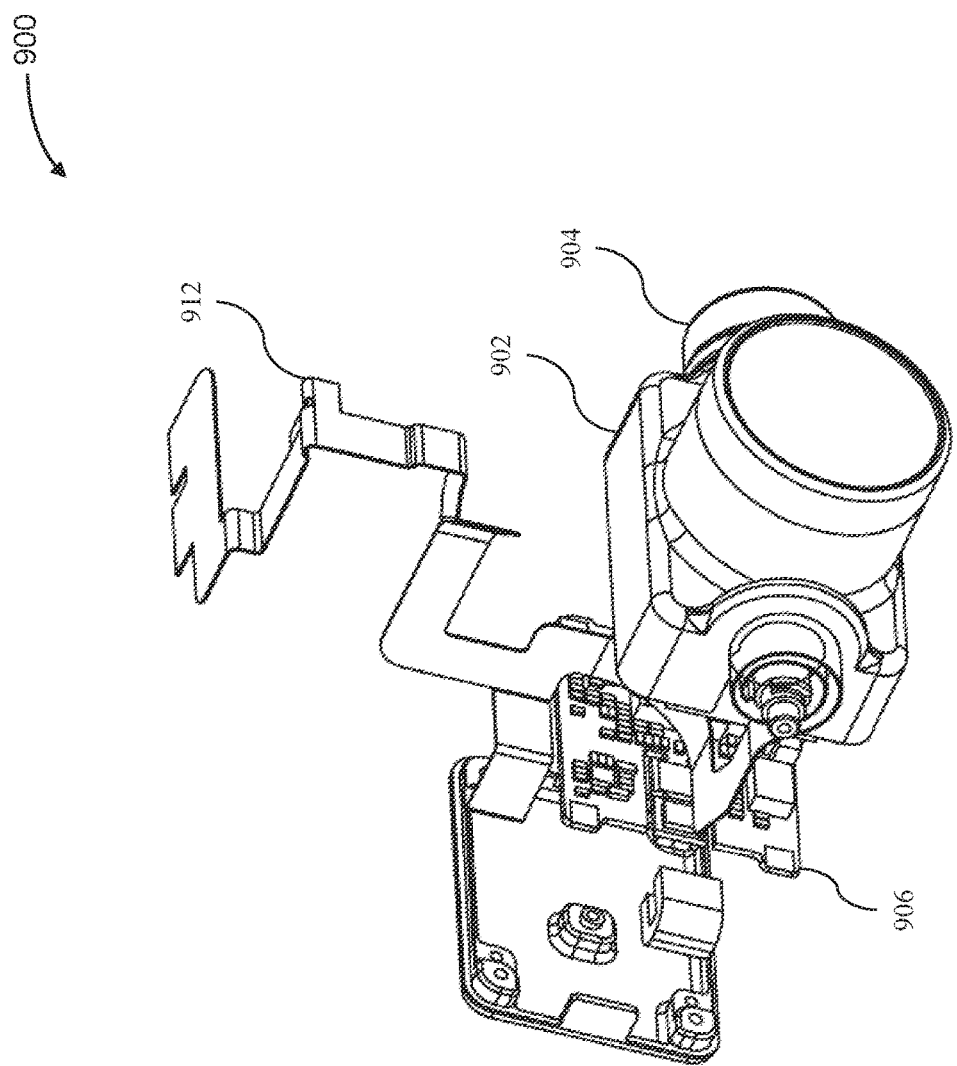
FIG. 9 is an exploded view illustrating an imaging device in accordance with an embodiment of the disclosure.

FIG. 9 is an exploded view illustrating an arrangement of second coupling line 912 in accordance with an embodiment of the disclosure. The body 902 of an imaging device 900 may be directly attached to a motor 904 of a gimbal. In some embodiments, the motor may be a pitch motor which permits the imaging device to move about a pitch axis. The imaging device may be a camera. In this configuration, the circuit board 906 may be received in the camera body. The second coupling line 912 may be a Flexible Printed Circuit (FPC). The second coupling line may be a FPC having braches to be connected to the ESC units for controlling the roll motor and yaw motor of the gimbal. The second coupling line may at one end be connected to the IMU, for example, the IMU controller which is a part of the IMU, and transmits the generated motor instructions to respective ESC units, and at the other end connected to the roll motor and yaw motor through branches. In addition to the motor control instructions, the second coupling line may transmit the captured images and videos by the imaging device to an image processing unit or image transmission unit which may be provided in the support member or in the bearing object.

In some embodiments, the one end of the second coupling line may be wounded around a pitch rotating axis of the imaging device at a side of the imaging device opposite to the pitch motor. The second coupling line may have a linear part which extends out to the roll motor and the yaw motor and a coiled part which is wounded around the pitch rotating axis of the imaging device. The one end of the second coupling line may at be connected to the IMU by penetrating through the side wall of the imaging device. This configuration may prevent the second coupling line from winding or folding during a rotation of the imaging device about the pitch axis, because the coiled part of the second coupling line may absorb the rotating of the imaging device without stretching the linear part of the second coupling.

A coiled part of the second coupling line may be housed in an end cap provided at the side of the imaging device opposite to the pitch motor. The linear part of the second coupling line may be routed along the frame components of the gimbal to the roll motor and the yaw motor. The configuration described herein above may be applied to a configuration where the first coupling line is connected to the roll motor and/or yaw motor.

Figure 10:
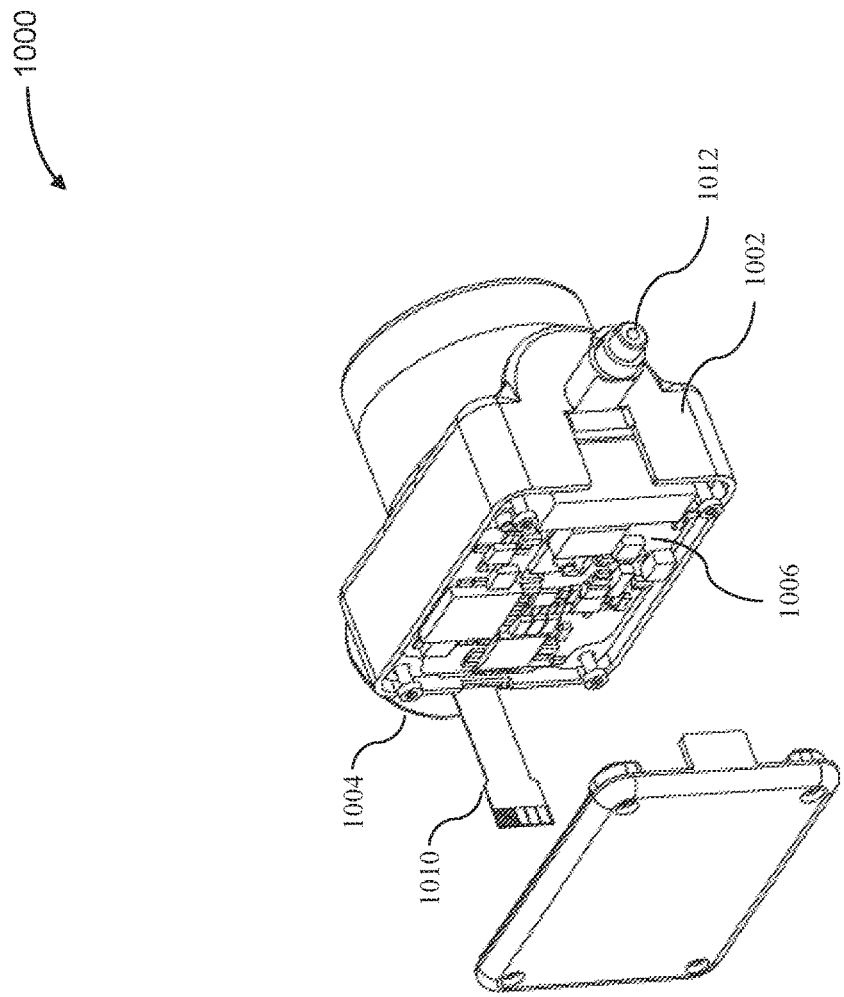
FIG. 10 is a diagram illustrating a circuit board carrying an IMU being fixedly attached to an imaging device, in accordance with an embodiment of the disclosure.

FIG. 10 is a diagram illustrating a circuit board 1006 carrying an IMU being fixedly attached to an imaging device, in accordance with an embodiment of the disclosure. The body 1002 of a body of an imaging device 1000 may be directly attached to a motor 1004 of a gimbal. In some embodiments, the motor may be a pitch motor which permits the imaging device to move about a pitch axis. The imaging device may be a camera.

The circuit board, on which the IMU and at least one ESC unit are supported, may be attached to an interior of the imaging device. The circuit board may be fixedly attached to the interior of the imaging device through a plurality of fasteners such as screws, studs or bolts. In some examples, the circuit board may have a shape conforming to the interior contour of the imaging device. The circuit board may be fitted into the interior of the imaging device with substantially no space between the edges of the circuit board with the inner faces of the imaging device. Alternatively, one or more damping elements may be provided between the circuit board and the inner faces of the imaging device. The damping elements may absorb any shock or vibration experienced by the circuit board. The providing of damping elements may prevent any component on the circuit board from dropping during a movement of the imaging device.

The first coupling line 1010 may be a FPC. In some examples, the first coupling line may transmit the pitch motor control instruction from the at least one ESC unit supported by the circuit board to the pitch motor. One end of the first coupling line may be connected to the at least one ESC unit supported on the circuit board, and the other end of the first coupling line may be connected to the gimbal motor. The one end of the first coupling line may be tightly pressed on the sockets on the circuit board by a damping element which is provided between the rear cover 1008 and the circuit board, such that a connection between the first coupling line and the socket may not release during the movement of the payload.

The second coupling line (not shown) may be connected to the circuit board through the rotating axis member 1012 of the imaging device. In some examples, the second coupling line may at one end be connected to the IMU controller of the IMU, which generates motor control instruction based upon state information as measured and transmits the motor control instruction to respective ESC units, and at the other end connected to the roll motor and yaw motor through branches. The second coupling line may be a FPC. The one end of the second coupling line may be wounded around the pitch rotating axis member of the imaging device at a side of the imaging device opposite to the pitch motor. The one end of the second coupling line may penetrate the pitch rotating axis member into the interior of the imaging device and being connected to the circuit board.

The rear cover may be fixed attached to the body of the imaging device so as to encapsulate the body. For example, the rear cover may be rigidly attached to the body through a plurality of fasteners such as screws. The fasteners may be provided at corners of the rear cover, the edges of the rear cover or the center of the rear cover. Alternatively, the rear cover may be releasably attached to the body of the imaging device. For example, the rear cover may be attached to the body of the imaging device through a snap fastener, a buckle, or a clip. The rear cover may seal the body of the imaging device in an air tight and water-proofing manner. One or more damping elements may be provided between the rear cover and the circuit board to damp any shock or vibration experienced by the circuit board.

Figure 11:
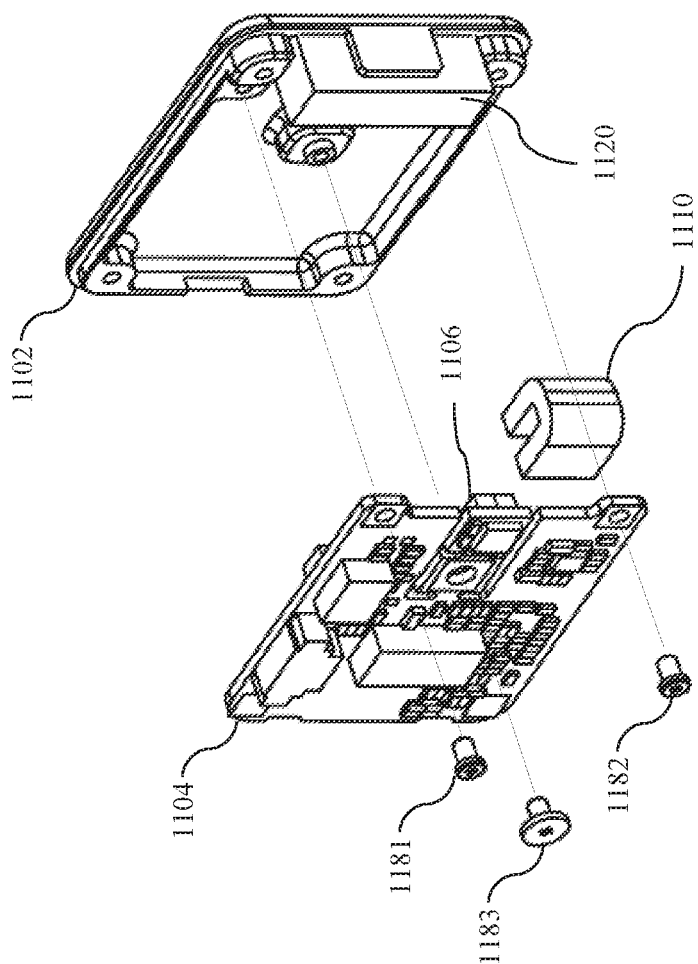
FIG. 11 is a diagram illustrating a circuit board carrying an IMU to be fixedly attached to a rear cover of an imaging device, in accordance with an embodiment of the disclosure.

FIG. 11 is a diagram illustrating a circuit board carrying an IMU to be fixedly attached to a rear cover of an imaging device, in accordance with an embodiment of the disclosure. The circuit board 1104 may be received in the payload. For example, the circuit board, on which the IMU 1106 and at least one ESC unit are supported, may be fixedly attached to an interior surface of the payload such as a camera. In some embodiments, the circuit board may be fixedly attached to a rear cover 1102 of the payload. The circuit board may be a PCB board as discussed hereinabove with reference to FIG. 5.

The circuit board may be attached to the payload by various fasteners. The fastener may be a screw, a bolt, a stud, a snap fastener, a buckle, a clip, a pin, a hook, a rivet, a staple, a stitch, a strap, a zipper, a press fit, a welding or a glue. The circuit board may be attached to the payload via one fastener. Alternatively, the circuit board may be attached to the payload via a plurality of fasteners. In some embodiments, the circuit board may be attached to the rear cover via three screws 1181, 1182 and 1183 which penetrate holes on the circuit boards and screws into receiving holes on the rear cover of the payload. The one or more holes, through which the one or more fasteners may penetrate, may be provided on any location of the circuit board. For example, the holes may be provided at a location where a density of electrical components is small. For another example, the holes may be provided on corners or edges of the circuit board. In some embodiments, the holes may be provided in proximity to the IMU such that the IMU can be rigidly attached to the rear cover of the payload.

The circuit board may be directly attached to the rear cover without an intermediate layer therebetween. Alternatively, the circuit board may be attached to the rear cover with an intermediate layer therebetween. In some instance, the intermediate layer may be a damping element 1120 to absorb any shock or vibration experienced by the payload. The damping element may be provided in multiple at various locations between the circuit board and the rear cover of the payload. In some embodiments, the damping element may also tightly press any exterior electrical cable to a connector of the circuit board, such that the connection between the exterior electrical cable and the connector of the circuit board may not release by accident even if the payload experience a shock. For example, the vibration dampening pad may tightly press the FPC, which transmits the state information member as generated by the IMU to exterior ESC units, again the socket on the circuit board. For example, the first and second coupling lines may be tightly pressed on the sockets on the circuit board by the damping element, such that a connection between the first and second coupling lines and the sockets may not release during the movement of the payload.

The IMU may be provided on the circuit board in a manner the IMU is affected by a shock or vibration experienced by the payload to the minimum extent. In some embodiments, the IMU may be provided on a peninsula-like portion of the circuit board where only one side of the peninsula-like portion is attached to the other portion of the circuit board. Only a portion of the shock or vibration experienced by the payload may propagate to the peninsula-like portion, such that the IMU may be less affected by the shock or vibration and the accuracy in measurement may not be affected. In some embodiments, the IMU and/or the portion of the circuit board on which the IMU is disposed may be covered by a vibration dampening member 1110 to keep a working temperature of the IMU constant to further improve the measurement accuracy. The vibration dampening member may fill between the IMU and/or the portion of the circuit board and the rear cover of the payload, such that no relative movement occurs between the IMU and/or the portion of the circuit board and the rear cover. In some embodiments, the vibration dampening member may be formed in a U-shape. For example, the U-shaped vibration dampening member may cover the IMU and/or the portion of the circuit board on which the IMU is disposed on two sides, as shown in FIG. 11.

Figure 12:
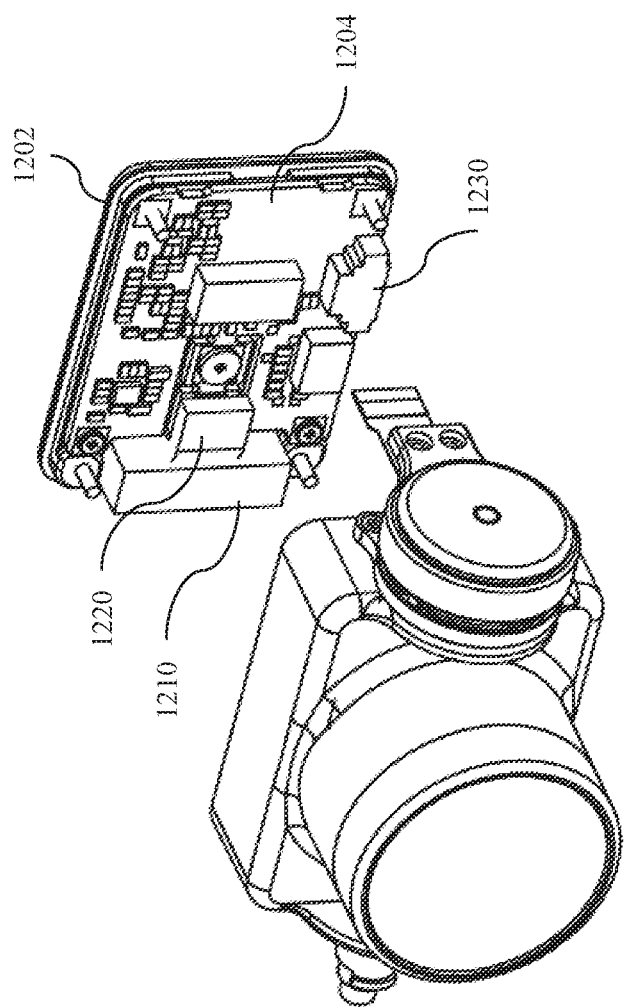
FIG. 12 is a diagram illustrating a circuit board carrying an IMU being fixedly attached to a rear cover of an imaging device, in accordance with an embodiment of the disclosure.

FIG. 12 is a diagram illustrating a circuit board carrying an IMU being fixedly attached to a rear cover of an imaging device, in accordance with an embodiment of the disclosure. FIG. 12 shows an assembled state of the circuit board to the rear cover of the payload of FIG. 11.

The circuit board 1204 on which the IMU is supported may be fixedly attached to a rear cover 1208 of the payload. In some embodiments, the circuit board may be attached to the rear cover by a plurality of fasteners such as screws which are provided in proximity to the IMU. For example, three screws may be provided to penetrate holes on the circuit boards and screws into receiving holes on the rear cover of the payload. The three screws may form a triangle shape encompassing the IMU.

A plurality of damping elements 1210, 1220 and 1230 may be provided between the circuit board and the body 1202 of the payload to tightly press the circuit board against the rear cover. At least one of the damping elements may cover the IMU. The damping element may reduce the shock or vibration experienced by the IMU to improve a measurement accuracy. The damping element may also keep a working temperature of the IMU constant to further improve the measurement accuracy. At least one of the damping elements may press the first coupling line and second coupling line (not shown) against the circuit board, such that a connection between the first coupling line and the socket may not release during the movement of the payload.

The systems, devices, and methods described herein can be applied to a wide variety of objects, including movable objects and stationary objects. The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be an aerial vehicle. An aerial vehicle can be self-propelled, such as self-propelled through the air. A self-propelled aerial vehicle can utilize a propulsion system, such as a propulsion system including one or more engines, motors, wheels, axles, magnets, rotors, propellers, blades, nozzles, or any suitable combination thereof.

Any description herein of an aerial vehicle, such as a UAV, may apply to and be used for any movable object. Any description herein of an aerial vehicle may apply specifically to UAVs. A movable object of the present disclosure can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle, bicycle; a movable structure or frame such as a stick, fishing pole; or a train), under the ground (e.g., a subway), in space (e.g., a spaceplane, a satellite, or a probe), or any combination of these environments.

The movable object can be controlled remotely by a user or controlled locally by an occupant within or on the movable object. The movable object may be controlled remotely via an occupant within a separate vehicle. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

Figure 13:
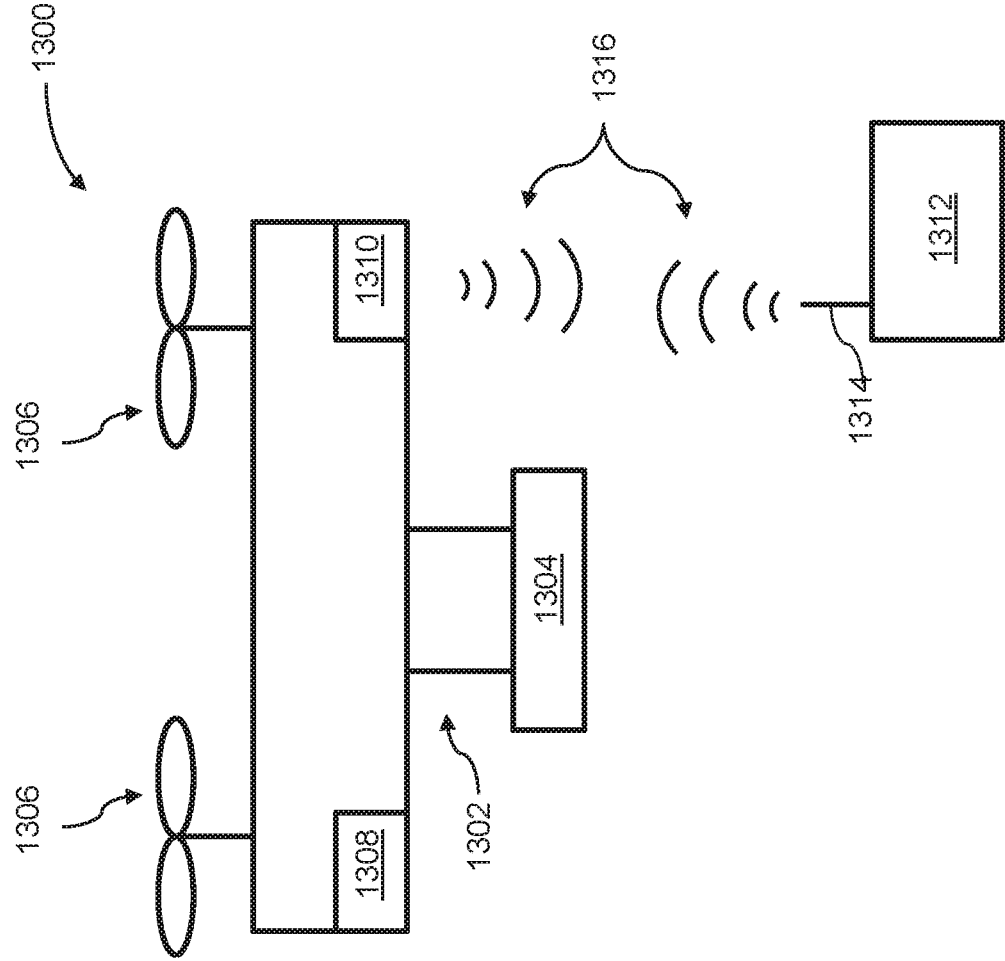
FIG. 13 illustrates a movable object including a carrier and a payload, in accordance with embodiments of the present disclosure.

FIG. 13 illustrates a movable object 1300 including a carrier 1302 and a payload 1304, in accordance with embodiments of the present disclosure. Although the movable object 1300 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 1304 may be provided on the movable object 1300 without requiring the carrier 1302. The movable object 1300 may include propulsion mechanisms 1306, a sensing system 1308, and a communication system 1310.

The propulsion mechanisms 1306 can include one or more of rotors, propellers, blades, engines, motors, wheels, axles, magnets, or nozzles, as previously described. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 1306 can be mounted on the movable object 1300 using any suitable means, such as a support element (e.g., a drive shaft) as described elsewhere herein. The propulsion mechanisms 1306 can be mounted on any suitable portion of the movable object 1300, such on the top, bottom, front, back, sides, or suitable combinations thereof.

In some embodiments, the propulsion mechanisms 1306 can enable the movable object 1300 to take off vertically from a surface or land vertically on a surface without requiring any horizontal movement of the movable object 1300 (e.g., without traveling down a runway). Optionally, the propulsion mechanisms 1306 can be operable to permit the movable object 1300 to hover in the air at a specified position and/or orientation. One or more of the propulsion mechanisms 1300 may be controlled independently of the other propulsion mechanisms. Alternatively, the propulsion mechanisms 1300 can be configured to be controlled simultaneously. For example, the movable object 1300 can have multiple horizontally oriented rotors that can provide lift and/or thrust to the movable object. The multiple horizontally oriented rotors can be actuated to provide vertical takeoff, vertical landing, and hovering capabilities to the movable object 1300. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1300 (e.g., with respect to up to three degrees of translation and up to three degrees of rotation).

The sensing system 1308 can include one or more sensors that may sense the spatial disposition, velocity, and/or acceleration of the movable object 1300 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 1308 can be used to control the spatial disposition, velocity, and/or orientation of the movable object 1300 (e.g., using a suitable processing unit and/or control module, as described below). Alternatively, the sensing system 1308 can be used to provide data regarding the environment surrounding the movable object, such as weather conditions, proximity to potential obstacles, location of geographical features, location of manmade structures, and the like.

The communication system 1310 enables communication with terminal 1312 having a communication system 1314 via wireless signals 1316. The communication systems 1310, 1314 may include any number of transmitters, receivers, and/or transceivers suitable for wireless communication. The communication may be one-way communication, such that data can be transmitted in only one direction. For example, one-way communication may involve only the movable object 1300 transmitting data to the terminal 1312, or vice-versa. The data may be transmitted from one or more transmitters of the communication system 1310 to one or more receivers of the communication system 1312, or vice-versa. Alternatively, the communication may be two-way communication, such that data can be transmitted in both directions between the movable object 1300 and the terminal 1312. The two-way communication can involve transmitting data from one or more transmitters of the communication system 1310 to one or more receivers of the communication system 1314, and vice-versa.

In some embodiments, the terminal 1312 can provide control data to one or more of the movable object 1300, carrier 1302, and payload 1304 and receive information from one or more of the movable object 1300, carrier 1302, and payload 1304 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 1306), or a movement of the payload with respect to the movable object (e.g., via control of the carrier 1302). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 1308 or of the payload 1304). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 1312 can be configured to control a state of one or more of the movable object 1300, carrier 1302, or payload 1304. Alternatively or in combination, the carrier 1302 and payload 1304 can also each include a communication module configured to communicate with terminal 1312, such that the terminal can communicate with and control each of the movable object 1300, carrier 1302, and payload 1304 independently.

In some embodiments, the movable object 1300 can be configured to communicate with another remote device in addition to the terminal 1312, or instead of the terminal 1312. The terminal 1312 may also be configured to communicate with another remote device as well as the movable object 1300. For example, the movable object 1300 and/or terminal 1312 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 1300, receive data from the movable object 1300, transmit data to the terminal 1312, and/or receive data from the terminal 1312. Optionally, the remote device can be connected to the Internet or other telecommunications network, such that data received from the movable object 1300 and/or terminal 1312 can be uploaded to a web site or server.

While some embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the invention and that methods and structures within the scope of these claims and their equivalents be covered thereby.

What is claimed is:

1. A stabilizing platform for stabilizing a payload, comprising:
    a frame assembly comprising a plurality of frame components movable relative to one another, the frame assembly being configured to support the payload and connect the payload to a carrier;
    a plurality of actuators configured to permit the plurality of frame components to move relative to one another and to move relative to the carrier, the plurality of actuators comprising a first actuator that is configured to control movement of the payload about a first axis, and a second actuator that is configured to control movement of the payload about a second axis;
    a plurality of electronic speed control (ESC) units each electrically coupled to a corresponding actuator of the plurality of actuators and configured to control actuation of the corresponding actuator; and
    a state measurement member supported by the payload, the state measurement member being configured to obtain state of the payload;
    wherein:
        at least one of the plurality of ESC units and the state measurement member are provided on a same circuit board or integrated as one integrated circuit to allow the at least one of the plurality of ESC units to control the corresponding actuator according to the state of the payload in a real-time manner;
        at least one of the plurality of frame components includes a cavity, one of the plurality of actuators allowing the at least one of the plurality of frame components that includes the cavity to move relative to the carrier; and
        at least two of the plurality of ESC units are received and sealed in the cavity of the at least one of the plurality of frame components.

2. The stabilizing platform of claim 1, wherein the state measurement member is provided inside the payload.

3. The stabilizing platform of claim 1, wherein the actuation of the plurality of actuators is controlled according to the state of the payload.

4. The stabilizing platform of claim 1, wherein the state measurement member includes an inertial measurement unit (IMU).

5. The stabilizing platform of claim 4, wherein the IMU comprises a gyroscope, an accelerometer, and an IMU controller.

6. The stabilizing platform of claim 5, wherein:
    the IMU controller is configured to generate motor control instructions based upon the state of the payload; and
    each of the plurality of ESC units is configured to control the actuation of the corresponding actuator according to the motor control instructions.

7. The stabilizing platform of claim 1, wherein the circuit board includes a printed circuit board (PCB).

8. The stabilizing platform of claim 1, wherein the frame assembly comprises a first frame component that supports the payload and permits the payload to rotate about the first axis.

9. The stabilizing platform of claim 8, wherein the first actuator is configured to control movement of the first frame assembly.

10. The stabilizing platform of claim 9, wherein the first actuator includes a motor, a rotor of the motor being attached to the first frame and a stator of the motor being attached to the payload.

11. The stabilizing platform of claim 10, wherein the first actuator includes a brushless motor.

12. The stabilizing platform of claim 8, wherein the plurality of ESC units comprise a first ESC unit configured to control actuation of the first actuator.

13. The stabilizing platform of claim 12, wherein the first ESC unit is received in the payload.

14. The stabilizing platform of claim 8, wherein the first axis is a pitch axis.

15. The stabilizing platform of claim 8, wherein the frame assembly further comprises a second frame component that supports the first frame component and permits the first frame component to rotate about the second axis.

16. The stabilizing platform of claim 15, wherein the second actuator is configured to control movement of the second frame assembly.

17. The stabilizing platform of claim 15, wherein the plurality of ESC units comprise a second ESC unit configured to control actuation of the second actuator.

18. The stabilizing platform of claim 17, wherein the second ESC unit is provided in the payload.

19. The stabilizing platform of claim 17, wherein the second ESC unit is not provided in the payload.

20. The stabilizing platform of claim 15, wherein the second axis is a roll axis.

21. The stabilizing platform of claim 15, wherein the frame assembly further comprises a third frame component that supports the second frame component and permits the second frame component to rotate about a third axis.

22. The stabilizing platform of claim 21, wherein the plurality of actuators comprise a third actuator configured to control movement of the third frame assembly.

23. The stabilizing platform of claim 22, wherein the plurality of ESC units further comprise a third ESC unit configured to control actuation of the third actuator.

24. The stabilizing platform of claim 21, wherein the third axis is a yaw axis.

25. The stabilizing platform of claim 1, wherein the payload includes a camera.

26. The stabilizing platform of claim 1, wherein the stabilizing platform includes a multidimensional gimbal.

27. The stabilizing platform of claim 1, wherein the first axis is perpendicular to the second axis.

28. The stabilizing platform of claim 1, wherein the plurality of actuators further comprise a third actuator that is configured to control movement of the payload about a third axis.

29. The stabilizing platform of claim 28, wherein the third axis is perpendicular to the first axis and the second axis.

30. The stabilizing platform of claim 1, wherein the frame assembly comprises at least three frame components that are movable relative to one another.

31. The stabilizing platform of claim 1, wherein the plurality of frame components are movably connected to one another by joints, and each joint includes a sensor configured to detect position or rotation of corresponding connected frame components.

32. The stabilizing platform of claim 1, further comprising:
at least one coupling line connecting one of the ESC units to a corresponding actuator,
wherein the at least one coupling line includes a linear part and a coil part.

33. The stabilizing platform of claim 1, wherein at least one of the plurality of actuators is connected between the carrier and the at least one of the plurality of frame components that includes the cavity.

34. The stabilizing platform of claim 1, wherein:
the circuit board is located inside the payload; and
the at least one of the plurality of ESC units, the state measurement member, and an optical sensor of the payload are integrated together on the circuit board.

35. The stabilizing platform of claim 1, wherein the at least one of the plurality of ESC units that is integrated with the state measurement member is configured to control a movement of the payload around a pitch axis.

36. The stabilizing platform of claim 1, wherein a distance between the at least one of the plurality of ESC units and the state measurement member is less than 50 mm.

* * * * *